US011799769B2

(12) United States Patent
Xie

(10) Patent No.: US 11,799,769 B2
(45) Date of Patent: Oct. 24, 2023

(54) PACKET PROCESSING METHOD, APPARATUS, SYSTEM, AND DEVICE, AND STORAGE MEDIUM

(71) Applicant: Huawei Technologies Co., Ltd., Shenzhen (CN)

(72) Inventor: Jingrong Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 17/720,830

(22) Filed: Apr. 14, 2022

(65) Prior Publication Data

US 2022/0239590 A1 Jul. 28, 2022

Related U.S. Application Data

(63) Continuation of application No. PCT/CN2020/116350, filed on Sep. 19, 2020.

(30) Foreign Application Priority Data

Oct. 14, 2019 (CN) .......................... 201910973860.6
Nov. 1, 2019 (CN) .......................... 201911062044.6

(51) Int. Cl.
*G06F 15/16* (2006.01)
*H04L 45/42* (2022.01)
(Continued)

(52) U.S. Cl.
CPC .............. *H04L 45/42* (2013.01); *H04L 45/24* (2013.01); *H04L 45/50* (2013.01); *H04L 45/655* (2022.05)

(58) Field of Classification Search
CPC .......... H04L 45/24; H04L 45/42; H04L 45/50; H04L 45/655
(Continued)

(56) References Cited

U.S. PATENT DOCUMENTS 9,438,432 B2 * 9/2016 Shepherd .............. H04L 45/745
9,544,230 B2 * 1/2017 Wijnands ................ H04L 12/18
(Continued)

FOREIGN PATENT DOCUMENTS

CN 101075973 A 11/2007
CN 101483595 A 7/2009
(Continued)

OTHER PUBLICATIONS

L. Ginsberg, Ed. et al., "Bit Index Explicit Replication (BIER) Support via IS-IS," Jun. 2018, 12 pages.
(Continued)

*Primary Examiner* — Moustafa M Meky
(74) *Attorney, Agent, or Firm* — Conley Rose, P.C.

(57) ABSTRACT

A packet processing method includes a first network device receiving a first Bit Index Explicit Replication (BIER) packet including a first BIER header. When the first BIER packet is a packet sent to a second network device, and in response to determining that the second network device is an edge node device in a BIER communication network and does not support BIER packet forwarding, the first network device determines a target label used for a reverse path forwarding (RPF) check, updates the first BIER packet to obtain a second BIER packet, where the second BIER packet includes the target label but does not include the first BIER header, and sends the second BIER packet to the second network device.

30 Claims, 16 Drawing Sheets

(51) Int. Cl.
*H04L 45/655* (2022.01)
*H04L 45/24* (2022.01)
*H04L 45/50* (2022.01)

(58) Field of Classification Search
USPC .......................................................... 709/238
See application file for complete search history.

(56) References Cited

U.S. PATENT DOCUMENTS

| | | | |
|---|---|---|---|
| 9,948,574 B2* | 4/2018 | Shepherd | H04L 12/18 |
| 10,164,794 B2* | 12/2018 | Wijnands | H04L 45/745 |
| 10,432,425 B2* | 10/2019 | Wang | H04L 12/4625 |
| 10,447,496 B2* | 10/2019 | Wang | H04L 12/4633 |
| 10,498,547 B2* | 12/2019 | Wijnands | H04L 45/16 |
| 10,498,667 B2* | 12/2019 | Kotalwar | H04L 47/806 |
| 10,574,479 B2* | 2/2020 | Wijnands | H04L 45/7452 |
| 10,855,576 B2* | 12/2020 | Zhang | H04L 12/4641 |
| 10,985,942 B2* | 4/2021 | Wang | H04L 12/4625 |
| 11,303,470 B2* | 4/2022 | Wijnands | H04L 45/7452 |
| 2006/0221975 A1 | 10/2006 | Lo et al. | |
| 2015/0078377 A1 | 3/2015 | Wijnands et al. | |
| 2015/0138961 A1 | 5/2015 | Wijnands et al. | |
| 2016/0119159 A1 | 4/2016 | Zhao et al. | |
| 2017/0033939 A1 | 2/2017 | Bragg et al. | |
| 2018/0287934 A1* | 10/2018 | Wang | H04L 12/44 |
| 2018/0287935 A1* | 10/2018 | Wang | H04L 12/4625 |
| 2018/0316520 A1* | 11/2018 | Wijnands | H04L 45/50 |
| 2019/0013964 A1* | 1/2019 | Wijnands | H04L 12/4625 |
| 2019/0014035 A1* | 1/2019 | Zhang | H04L 45/16 |
| 2019/0097944 A1 | 3/2019 | Kotalwar et al. | |
| 2019/0386848 A1* | 12/2019 | Wang | H04L 12/4625 |
| 2020/0153728 A1 | 5/2020 | Xie | |
| 2020/0169432 A1* | 5/2020 | Wijnands | H04L 45/50 |

FOREIGN PATENT DOCUMENTS

| | | |
|---|---|---|
| CN | 101599841 A | 12/2009 |
| CN | 102368726 A | 3/2012 |
| CN | 105556899 A | 5/2016 |
| CN | 108989209 A | 12/2018 |
| CN | 109246624 A | 1/2019 |

OTHER PUBLICATIONS

J. Xie et al., "Multicast VPN Using MPLS P2MP and BIER," draft-xie-bier-mvpn-mpls-p2mp-02, Jul. 2, 2018, 18 pages.

Z. Zhan, "BIER Penultimate Hop Popping," draft-zzhang-bier-php-00, Jul. 2, 2018, 7 pages.

T. Eckert, Ed. et al., "Traffic Engineering for Bit Index Explicit Replication (BIER-TE)," draft-ietf-bier-te-arch-01, Oct. 23, 2018, 33 pages.

Z. Zhang, "BIER Penultimate Hop Popping," draft-ietf-bier-php-03, Oct. 3, 2019, 8 pages.

RFC 8279, IJ. Wijnands, Ed. et al., "Multicast Using Bit Index Explicit Replication (BIER)," Nov. 2017, 43 pages.

RFC 8296, IJ. Wijnands, Ed. et al., "Encapsulation for Bit Index Explicit Replication (BIER) in MPLS and Non-MPLS Networks," Jan. 2018, 24 pages.

RFC 8444, P. Psenak, Ed. et al., "OSPFv2 Extensions for Bit Index Explicit Replication (BIER)," Nov. 2018, 12 pages.

RFC 8556, E. Rosen, Ed. et al., "Multicast VPN Using Bit Index Explicit Replication (BIER)," Apr. 2018, 17 pages.

* cited by examiner

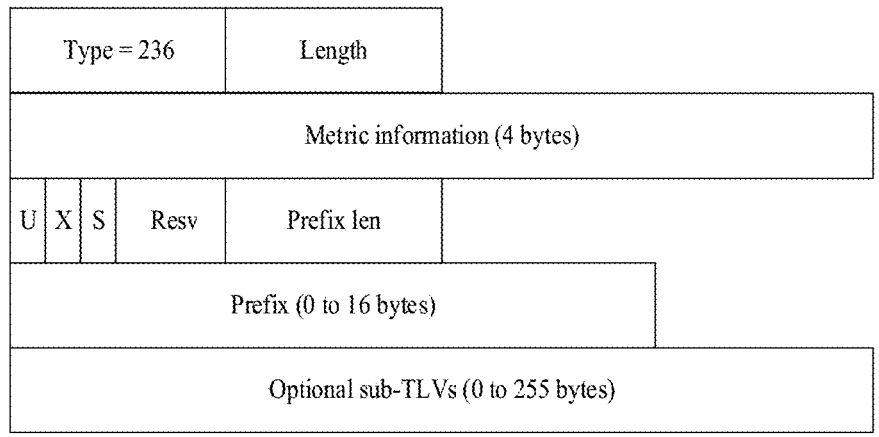
FIG. 8A
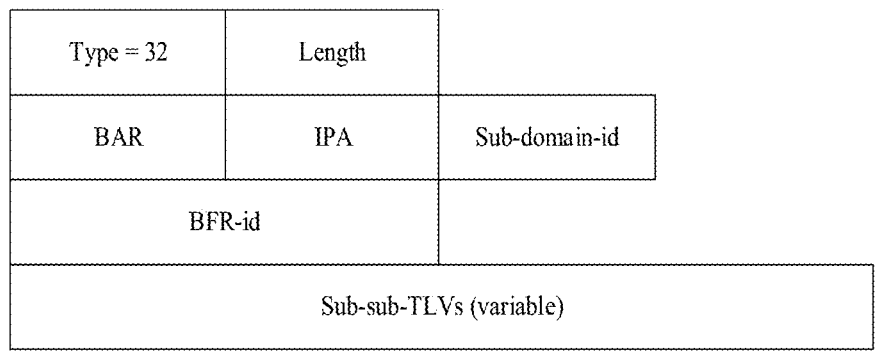
FIG. 8B
| Type = X | Length |
|---|---|
| BFIR-Prefix 1 | RPF-Label 1 |
| BFIR-Prefix 2 | RPF-Label 2 |
| BFIR-Prefix N | RPF-Label N |
FIG. 8C

| Type = 236 | Length |
|---|---|

| Metric information (4 bytes) |||||
|---|---|---|---|---|
| U | X | S | Resv | Prefix len |

| Prefix (0 to 16 bytes) |
|---|

| Optional sub-TLVs (0 to 255 bytes) |
|---|

FIG. 10A

| Type = 32 | Length | |
|---|---|---|
| BAR | IPA | Sub-domain-id |
| BFR-id || |
| Sub-sub-TLVs (variable) |||

FIG. 10B

| Type = X | Length |
|---|---|
| BFIR-Prefix 1 | RPF-Label 1 |
| BFIR-Prefix 2 | RPF-Label 2 |
| BFIR-Prefix N | RPF-Label N |

FIG. 10C

| Type = Y | Length |
|---|---|
| Proto N | Label N |
| Proto M | Label M |

FIG. 10D

PACKET PROCESSING METHOD, APPARATUS, SYSTEM, AND DEVICE, AND STORAGE MEDIUM

CROSS-REFERENCE TO RELATED APPLICATIONS

This is a continuation of International Patent Application No. PCT/CN2020/116350 filed on Sep. 19, 2020, which claims priority to Chinese Patent Application No. 201910973860.6 filed on Oct. 14, 2019 and Chinese Patent Application No. 201911062044.6 filed on Nov. 1, 2019. All of the aforementioned applications are hereby incorporated by reference in their entireties.

TECHNICAL FIELD

This application relates to the field of communication technologies, and in particular, to a packet processing method, apparatus, system, and device, and a storage medium.

BACKGROUND

A Bit Index Explicit Replication (BIER) technology is a multicast technology. In the BIER technology, a BIER forwarding router (BFR) identifier (BFR-id) is configured for each edge node device in a network. Configuration information of the edge node device is flooded in the network by using an interior gateway protocol (IGP), so that each node device in the network can determine which device is identified by each BFR-id.

In addition, each node device in the network establishes a forwarding table based on the information that is flooded by using the IGP and that is in a control plane packet. Each node device may forward a BIER packet in a forwarding plane by using the forwarding table, and process a received BIER packet.

SUMMARY

Embodiments of this application provide a packet processing method, apparatus, system, and device, and a storage medium, to resolve problems in related technologies. Technical solutions are as follows.

According to a first aspect, a packet processing method is provided, where the method is applied to a first network device in a BIER communication network, and the BIER communication network further includes a second network device. The method includes the first network device receiving a first BIER packet including a first BIER header. When the first BIER packet is a packet sent to the second network device, the first network device determines whether the second network device is an edge node device in the BIER communication network and whether the second network device supports BIER packet forwarding.

In response to that the first network device determines that the second network device is the edge node device in the BIER communication network and that the second network device does not support BIER packet forwarding, the first network device determines a target label, and updates the first BIER packet to a second BIER packet. The second BIER packet includes the target label and does not include the first BIER header, and the target label is used to trigger the second network device to perform a reverse path forwarding (RPF) check based on the target label. Then, the first network device sends the second BIER packet to the second network device. The BIER communication network communicates with a network device outside the BIER communication network by using the edge node device.

According to the method provided in this embodiment of this application, after the first network device receives the first BIER packet that includes the first BIER header and that is sent to the second network device, for a case in which the second network device is the edge node device and does not support BIER packet forwarding, the first network device updates the first BIER packet to the second BIER packet that includes the target label used for the RPF check and does not include the first BIER header, so that the edge node device that does not support BIER packet forwarding, namely, the second network device, can perform the RPF check without depending on information in a payload. This can improve reliability of the RPF check, and can resolve a problem of large encapsulation overheads or a large number of used labels.

In an example embodiment, that the first network device determines whether the second network device is an edge node device in the BIER communication network and whether the second network device supports BIER packet forwarding includes: The first network device obtains information about the second network device, and determines, based on the information about the second network device, whether the second network device is the edge node device in the BIER communication network and whether the second network device supports BIER packet forwarding.

In an example embodiment, that the first network device determines a target label includes: The first network device obtains a first correspondence, where the first correspondence is a correspondence between information about a specified BFIR and a label corresponding to the specified BFIR; and determines, based on the first correspondence, the label corresponding to the specified BFIR.

In an example embodiment, that the first network device determines a target label includes: The first network device obtains a first correspondence and a second correspondence, where the first correspondence is a correspondence between information about a specified BFIR and a label corresponding to the specified BFIR, and the second correspondence is a correspondence between a packet type and a label used to indicate the packet type; and determines, based on the first correspondence, the label corresponding to the specified BFIR, and determines, based on the second correspondence, the label used to indicate the packet type.

In an example embodiment, that the first network device determines a target label includes: The first network device obtains a third correspondence, where the third correspondence is a correspondence among a sub-domain, information about a specified BFIR, and a label corresponding to the specified BFIR; and determines, based on the third correspondence, the label corresponding to the specified BFIR.

In an example embodiment, the BIER communication network is a BIER domain, and the first network device is a bit forwarding router BFR in the BIER domain.

According to a second aspect, a packet processing method is provided, where the method is applied to a second network device in a BIER communication network, the second network device is an edge node device in the BIER communication network, the BIER communication network communicates with a network device outside the BIER communication network by using the edge node device, and the BIER communication network further includes a first network device. The packet processing method includes: The second network device receives a second BIER packet sent by the first network device, where the second BIER packet is obtained through a first BIER packet updated by the first network device, the first BIER packet includes a first BIER header, the second BIER packet includes a target label and does not include the first BIER header, and the target label is used to trigger the second network device to perform an RPF check based on the target label. The second network device obtains the target label in the second BIER packet. The second network device performs the RPF check based on the target label.

Because the second BIER packet has the target label used for the RPF check, the second network device performs the RPF check without depending on information in a payload. This can improve reliability of the RPF check, and resolve a problem of large encapsulation overheads or a large number of used labels.

In an example embodiment, that the second network device performs the RPF check based on the target label includes: determining information about a specified BFIR based on a label corresponding to the specified BFIR and a first correspondence, where the first correspondence is a correspondence between the information about the specified BFIR and the label corresponding to the specified BFIR; determining information about a first target BFIR based on the second BIER packet, where the information about the first target BFIR indicates information about a network device that is corresponding to a payload of the second BIER packet and that is expected by the second network device; and comparing the information about the specified BFIR with the information about the first target BFIR, and determining an RPF check result based on a comparison result.

In an example embodiment, the method further includes: determining, based on a second correspondence, a label used to indicate a packet type, where the second correspondence is a correspondence between the packet type and the label used to indicate the packet type; and determining the packet type based on the label used to indicate the packet type.

In an example embodiment, that the second network device performs the RPF check based on the target label includes: determining a sub-domain and information about a specified BFIR based on a label corresponding to the specified BFIR and a third correspondence, where the third correspondence is a correspondence among the sub-domain, the information about the specified BFIR, and the label corresponding to the specified BFIR; determining information about a second target BFIR based on the second BIER packet, where the information about the second target BFIR indicates information about a network device that is corresponding to a payload of the second BIER packet and that is expected by the second network device, and the information about the second target BFIR includes the sub-domain and a BFIR identifier; and comparing the sub-domain, the information about the specified BFIR, and the information about the second target BFIR, and determining an RPF check result based on a comparison result.

In an example embodiment, before the second BIER packet is received, the method further includes: obtaining the first correspondence between the information about the specified BFIR and the label corresponding to the specified BFIR; and advertising the first correspondence.

In an example embodiment, before the second BIER packet is received, the method further includes: obtaining the second correspondence between the packet type and the label used to indicate the packet type; and advertising the second correspondence.

In an example embodiment, before the second BIER packet is received, the method further includes: obtaining the third correspondence among the sub-domain, the information about the specified BFIR, and the label corresponding to the specified BFIR; and advertising the third correspondence.

According to a third aspect, a packet processing apparatus is provided, where the apparatus is applied to a first network device in a BIER communication network, and the BIER communication network further includes a second network device. The apparatus includes: a receiving module, configured to receive a first BIER packet, where the first BIER packet includes a first BIER header; a processing module, configured to: when the first BIER packet is a packet sent to the second network device, determine whether the second network device is an edge node device in the BIER communication network and whether the second network device supports BIER packet forwarding, where the BIER communication network communicates with a network device outside the BIER communication network by using the edge node device; and in response to that the first network device determines that the second network device is the edge node device in the BIER communication network and that the second network device does not support BIER packet forwarding, determine a target label, and update the first BIER packet to a second BIER packet, where the second BIER packet includes the target label and does not include the first BIER header, and the target label is used to trigger the second network device to perform a reverse path forwarding RPF check based on the target label; and a sending module, configured to send the second BIER packet to the second network device.

In an example embodiment, the processing module is configured to: obtain information about the second network device, and determine, based on the information about the second network device, whether the second network device is the edge node device in the BIER communication network and whether the second network device supports BIER packet forwarding.

In an example embodiment, the determining module is configured to: obtain a first correspondence, where the first correspondence is a correspondence between information about a specified BFIR and a label corresponding to the specified BFIR; and determine, based on the first correspondence, the label corresponding to the specified BFIR.

In an example embodiment, the determining module is configured to: obtain a first correspondence and a second correspondence, where the first correspondence is a correspondence between information about a specified BFIR and a label corresponding to the specified BFIR, and the second correspondence is a correspondence between a packet type and a label used to indicate the packet type; and determine, based on the first correspondence, the label corresponding to the specified BFIR, and determine, based on the second correspondence, the label used to indicate the packet type.

In an example embodiment, the determining module is configured to: obtain a third correspondence, where the third correspondence is a correspondence among a sub-domain, information about a specified BFIR, and a label corresponding to the specified BFIR; and determine, based on the third correspondence, the label corresponding to the specified BFIR.

According to a fourth aspect, a packet processing apparatus is provided, where the apparatus is applied to a second network device in a bit index explicit replication BIER communication network, the second network device is an edge node device in the BIER communication network, the BIER communication network communicates with a network device outside the BIER communication network by using the edge node device, and the BIER communication network further includes a first network device. The apparatus includes: a receiving module, configured to receive a second BIER packet sent by the first network device, where the second BIER packet is obtained through a first BIER packet updated by the first network device, the first BIER packet includes a first BIER header, the second BIER packet includes a target label and does not include the first BIER header, and the target label is used to trigger the second network device to perform a reverse path forwarding RPF check based on the target label; an obtaining module, configured to obtain the target label in the second BIER packet; and a check module, configured to perform the RPF check based on the target label.

In any one of the foregoing example embodiments, the target label includes a label corresponding to a specified bit forwarding ingress router BFIR, the label corresponding to the specified BFIR is allocated by the second network device, and the specified BFIR is a BFIR for sending the first BIER packet.

In any one of the foregoing example embodiments, the target label further includes a label of a unicast tunnel to the second network device.

In any one of the foregoing example embodiments, the target label further includes a label used to indicate a packet type.

In an example embodiment, the check module is configured to: determine information about the specified BFIR based on the label corresponding to the specified BFIR and a first correspondence, where the first correspondence is a correspondence between the information about the specified BFIR and the label corresponding to the specified BFIR; determine information about a first target BFIR based on the second BIER packet, where the information about the first target BFIR indicates information about a network device that is corresponding to a payload of the second BIER packet and that is expected by the second network device; and compare the information about the specified BFIR with the information about the first target BFIR, and determine an RPF check result based on a comparison result.

In an example embodiment, the apparatus further includes: a determining module, configured to: determine, based on a second correspondence, the label used to indicate the packet type, where the second correspondence is a correspondence between the packet type and the label used to indicate the packet type; and determine the packet type based on the label used to indicate the packet type.

In an example embodiment, the check module is configured to: determine a sub-domain and information about the specified BFIR based on the label corresponding to the specified BFIR and a third correspondence, where the third correspondence is a correspondence among the sub-domain, the information about the specified BFIR, and the label corresponding to the specified BFIR; determine information about a second target BFIR based on the second BIER packet, where the information about the second target BFIR indicates information about a network device that is corresponding to a payload of the second BIER packet and that is expected by the second network device, and the information about the second target BFIR includes the sub-domain and a BFIR identifier; and compare the sub-domain, the information about the specified BFIR, and the information about the second target BFIR, and determine an RPF check result based on a comparison result.

In an example embodiment, the apparatus further includes: a first advertising module, configured to: obtain the first correspondence between the information about the specified BFIR and the label corresponding to the specified BFIR, and advertise the first correspondence.

In an example embodiment, the first advertising module is further configured to: obtain the second correspondence between the packet type and the label used to indicate the packet type, and advertise the second correspondence.

In an example embodiment, the apparatus further includes: a second advertising module, configured to: obtain the third correspondence among the sub-domain, the information about the specified BFIR, and the label corresponding to the specified BFIR, and advertise the third correspondence.

According to a fifth aspect, a first network device is provided. The first network device is configured to perform the method according to any one of the first aspect.

According to a sixth aspect, a second network device is provided. The second network device is configured to perform the method according to any one of the second aspect.

According to a seventh aspect, a network device is provided. The network device has a function of implementing behavior of the first network device in the foregoing methods or a function of specifically implementing behavior of the second network device in the foregoing methods. The function may be implemented based on hardware, or may be implemented based on hardware executing corresponding software. The hardware or the software includes one or more modules corresponding to the foregoing function.

In a possible design, a structure of the network device includes a processor and an interface. The processor is configured to support the network device to execute a corresponding function in the foregoing methods. The interface is configured to support communication between the network device and another network device, and receive information or instructions in the foregoing methods from the other network device. The network device may further include a memory. The memory is coupled to the processor and is configured to store program instructions and data that are necessary for the network device.

In another possible design, the network device includes a processor, a transmitter, a receiver, a random-access memory, a read-only memory, and a bus. The processor is separately coupled to the transmitter, the receiver, the random-access memory, and the read-only memory through the bus. When the network device needs to be run, the network device is started by using a basic input/output system built into the read-only memory or a bootloader bootstrap system in an embedded system, to boot the network device to enter a normal running state. After the network device enters the normal running state, an application program and an operating system run in the random-access memory, to enable the processor to perform the method in the first aspect or any possible implementation of the first aspect.

According to an eighth aspect, a network device is provided. The network device includes a main control board and an interface board, and may further include a switching board. The network device is configured to perform the method in the first aspect or any possible implementation of the first aspect, or the network device is configured to perform the method in the second aspect or any possible implementation of the second aspect. Specifically, the network device includes modules configured to perform the method in the first aspect or any possible implementation of the first aspect; or the network device includes modules configured to perform the method in the second aspect or any possible implementation of the second aspect.

According to a ninth aspect, a network device is provided. The network device includes a controller and a first forwarding sub-device. The first forwarding sub-device includes an interface board, and may further include a switching board. The first forwarding sub-device is configured to execute a function of the interface board in the eighth aspect, and may further execute a function of the switching board in the eighth aspect. The controller includes a receiver, a processor, a transmitter, a random-access memory, a read-only memory, and a bus. The processor is separately coupled to the receiver, the transmitter, the random-access memory, and the read-only memory through the bus. When the controller needs to run, the controller is started by using a basic input/output system built into the read-only memory or a bootloader bootstrap system in an embedded system, to boot the controller to enter a normal running state. After the controller enters the normal running state, an application program and an operating system run in the random-access memory, to enable the processor to execute a function of the main control board in the eighth aspect.

According to a tenth aspect, a computer-readable storage medium is further provided. The storage medium stores at least one instruction, and the processor loads and executes the instruction, to implement the method according to any one of the first aspect or the second aspect.

Another communication apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive and send a signal. In addition, when the processor executes the instructions stored in the memory, the processor is enabled to perform the method in any one of the foregoing possible implementations.

In an example embodiment, there are one or more processors, and there are one or more memories.

In an example embodiment, the memory may be integrated with the processor, or the memory is disposed independently of the processor.

In a specific implementation process, the memory may be a non-transitory memory, for example, a read-only memory (ROM). The memory and the processor may be integrated into one chip, or may be disposed in different chips. A type of the memory and a mode in which the memory and the processor are disposed are not limited in an embodiment of this application.

A computer program is provided. The computer program includes computer program code. When the computer program code is run on a computer, the computer is enabled to perform the methods in the foregoing aspects.

A chip is provided. The chip includes a processor, configured to invoke, from a memory, instructions stored in the memory and run the instructions, to enable a communication device on which the chip is installed to perform the methods in the foregoing aspects.

Another chip is provided, including an input interface, an output interface, a processor, and a memory. The input interface, the output interface, the processor, and the memory are connected to each other through an internal connection path. The processor is configured to execute code in the memory. When the code is executed, the processor is configured to perform the methods in the foregoing aspects.

BRIEF DESCRIPTION OF DRAWINGS

FIG. 8A, FIG. 8B, and FIG. 8C are a schematic diagram of a format of a BIER packet according to an embodiment of this application;

FIG. 10A, FIG. 10B, FIG. 10C, and FIG. 10D are a schematic diagram of a format of a BIER packet according to an embodiment of this application;

DESCRIPTION OF EMBODIMENTS

Terms used in embodiments of this application are only used to explain specific embodiments of this application, but are not intended to limit this application.

A BIER technology is a multicast technology. In the BIER technology, a BFR-id is configured for each edge node device in a network, for example, the BFR-id is a value ranging from 1 to 256. Configuration information of each edge node device in the network is flooded in the network by using an IGP. The information flooded along with the IGP is referred to as BIER information. A flooding manner allows each node device in the network to determine a device that is identified by each BFR-id. For example, if a BFR-id of a node device is not 0, the node device is an edge node device. If a BFR-id of a node device is 0, the node device is an intermediate node device, namely, a non-edge node device.

Figure 1:
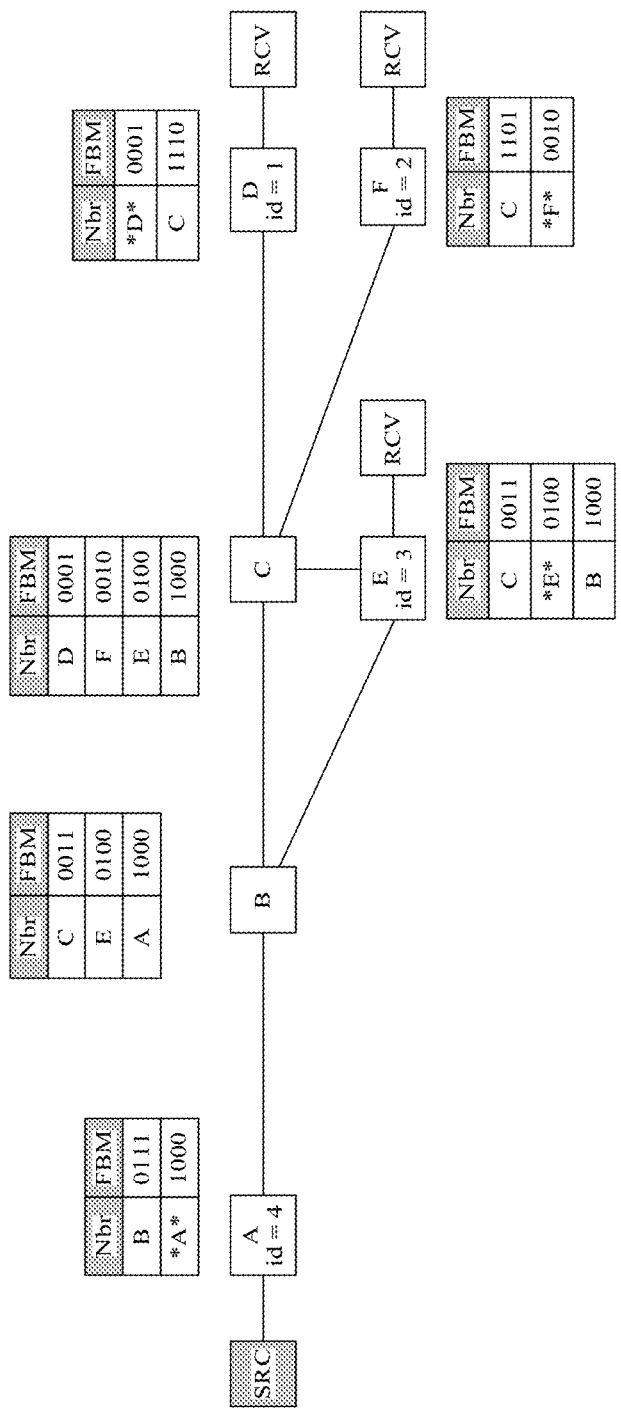
FIG. 1 is a schematic diagram of a structure of a network topology according to an embodiment of this application.

An example in which BIER information is flooded by using the IGP in a network shown in FIG. 1 is used. Edge node devices in the network include A, D, E, and F. As shown in FIG. 1, BFR-ids configured for the edge node devices A, D, E, and F are 4, 1, 2, and 3. The BFR-id of each edge node device is flooded by using the IGP. For example, each edge node device sends a control plane packet to another network device in the network. The control plane packet includes flooding information, and the flooding information includes the BFR-id of the edge node device, and further includes an Internet Protocol (IP) address, and encapsulation information. The encapsulation information includes an encapsulation type. For example, flooding information of the edge node device A carries the BFR-id, an IP address, and an encapsulation type that are of the edge node device A, and an MPLS label allocated to the corresponding edge node device A, where the encapsulation type is Multiprotocol Label Switching (MPLS). Node devices B and C are intermediate node devices, and no BFR-id needs to be configured for the node devices B and C. Therefore, BFR-ids in flooding information in control plane packets sent by the node devices B and C are accordingly set to 0. The flooding information in the control plane packets of the node devices B and C further includes other information such as IP addresses and encapsulation information of the node devices.

Figure 2:
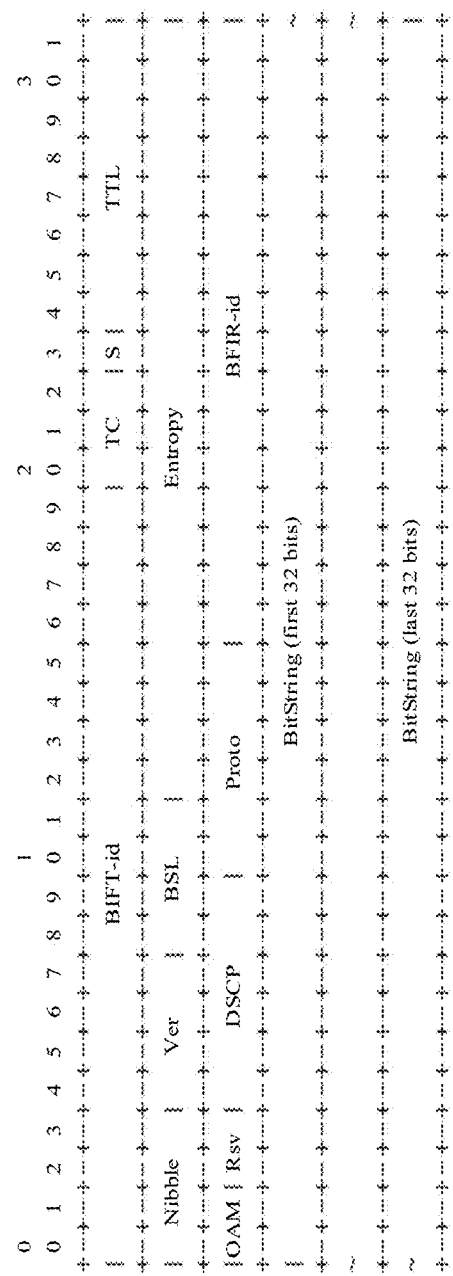
FIG. 2 is a schematic diagram of a structure of a BIER header according to an embodiment of this application.

In addition, each node device in the network establishes a forwarding table based on the information that is flooded by using the IGP and that is in the control plane. Each node device may forward a BIER packet in a forwarding plane by using the forwarding table, and the BIER packet includes a BIER encapsulation multicast data packet. For a BIER encapsulation format, refer to descriptions of a BIER header format in a Request for Comments (RFC) 8296. The BIER header format is a key to implementing BIER in the forwarding plane (chip). As shown in FIG. 2, the BIER header includes fields of 32 bits (4 bytes) including a BIER-Label or a BIER forwarding table identifier (e.g., a bit index forwarding table identifier) (BIFT-id) value, and the like. The first 20 bits are the BIER-Label or the BIFT-id value, and the last 12 bits are other information of the packet including a traffic class (TC), an S bit, and a time to live (TTL). The BIER header further includes other fields of 64 bits (8 bytes) including a discriminator (Nibble), a version (Ver), a bit string length (BSL), an entropy, operation, administration, and maintenance (OAM), reservation (Rsv), a differentiated services field code point (DSCP), a protocol (Proto), a BIER forwarding ingress router (BFIR) identifier (BFIR-id), and the like. The BIER header further includes a BitString. A length of the BitString may be of 64 bits, 128 bits, 256 bits, and the like. The BIER-Label or the BFR-id value may be used to determine the length of the BitString.

Each bit in the BitString field is used to identify a BIER forwarding edge router (BFER). For example, a least significant (rightmost) bit of the BitString is used to identify that a next hop is a node device whose BFR-id is 1. The second bit to the right of the BitString is used to identify a node device whose BFR-id is 2. A forwarding entry based on which the forwarding plane performs forwarding determines, based on the BitString in the BIER packet, which next hops to which the BIER packet is to be sent. If a plurality of bits corresponds to a same next hop, only one BIER packet is sent to the next hop.

In addition to content in the foregoing BIER packet, the BIER packet further relates to several key concepts such as a BIER domain, a sub-domain (SD), the bit string length (BSL), a set identifier (SI), and the BIFT-id.

BIER domain: a network area in which the BIER information is flooded by using the IGP or a BGP (underlay) and the BIER forwarding table is established. For example, if the IGP is deployed and the BIER information is flooded in an autonomous system (AS) domain, the AS domain is a BIER domain. In a network with a plurality of AS domains, the IGP may be deployed and the BIER information may be flooded in different AS domains; and the BGP is deployed but the BIER information is not flooded in the AS domains. In this case, the plurality of AS domains are different BIER domains. For details, refer to the RFC 8279: The BIER control-plane protocols (refer to Section 4.2) run within a "BIER domain", allowing the BFRs within that domain to exchange the information needed for them to forward packets to each other using BIER.

SD: A plurality of SDs may be configured for an IGP domain. One scenario is that different VPNs use different SDs. For example, a VPN 1 uses an SD 0 and a VPN 1 uses an SD 1. Alternatively, a plurality of VPNs use a same SD.

BSL: A length of a BitString of a packet may be of a plurality of types, for example, the length may be of 64 bits, 128 bits, 256 bits, 512 bits, 1024 bits, 2048 bits, and 4096 bits. Different BSLs are used based on a forwarding capability. A router may also support a plurality of lengths.

SI: For example, if a BSL is of 256 bits, but a network has more than 256 node devices or configured BFR-ids are more than 256, the node devices need to be divided into different sets. For example, node devices whose BFR-ids are from 1 to 256 belong to a set 0 (Set 0, or SI=0), and node devices whose BFR-ids are from 257 to 512 belong to a set 1 (Set 1, or SI=1).

BIFT-id: The BIFT-id (the BIFT-id is a Label in BIER-MPLS encapsulation) corresponds to a combination of the SD, the BSL, and the SI. In this way, a router that receives a BIER packet can learn of, based on the BIFT-id, an SD to which the packet belongs, a BSL (namely, a length of a BitString to be used in the following) to be used, and an SI to which the packet belongs. For example, the RFC 8296 provides the following examples:

L1: corresponding to SD 0, BSL 256, SI 0.
L2: corresponding to SD 0, BSL 256, SI 1.
L3: corresponding to SD 0, BSL 256, SI 2.
L4: corresponding to SD 0, BSL 256, SI 3.
L5: corresponding to SD 0, BSL 512, SI 0.
L6: corresponding to SD 0, BSL 512, SI 1.
L7: corresponding to SD 1, BSL 256, SI 0.
L8: corresponding to SD 1, BSL 256, SI 1.
L9: corresponding to SD 1, BSL 256, SI 2.
L10: corresponding to SD 1, BSL 256, SI 3.
L11: corresponding to SD 1, BSL 512, SI 0.
L12: corresponding to SD 1, BSL 512, SI 1.

In the foregoing label L2, for a label of SI=1, a node device represented by a BitString following a BIER packet whose BIER label is L2 is a node device whose BFR-id is from 257 to 512 instead of a node device whose BFR-id is 1 from to 256.

For example, the node devices in FIG. 1 establish the BIER forwarding table. A neighbor in the forwarding table may be a directly connected neighbor in the network topology, or may be an indirectly connected neighbor, for example, an indirectly connected neighbor calculated according to the section 6.9 of the RFC 8279. Neighbors device of the edge node device A include the node device B. In the network topology shown in FIG. 1, because next hops of BFER node devices whose BFR-ids are 1/2/3 are all the node device B, a neighbor entry of the edge node device A is established as follows: Neighbor (Nbr)=B, forwarding bit mask (FBM)=0111.

Each bit in the FBM indicates one edge node device. If there are a large quantity of edge node devices, the edge node devices may be divided into different sets. For a plurality of sets, the FBM includes bit strings of the plurality of sets. For example, there are 512 edge node devices in the network topology. The 512 edge node devices are divided into two sets: a set 0 and a set 1. One set uses a 256-bit bit string. In this case, an FBM of a neighbor may include two 256-bit bit strings: a bit string corresponding to the set 0 and a bit string corresponding to the set 1.

For the neighbor entry of the edge node device A, when the first bit, the second bit, and third bit to the right of the BitString in the BIER packet are 1, the edge node device A sends the BIER packet to the neighboring node device B. When the fourth bit to the right of the BitString in the BIER packet is 1 (for example, a BIER packet sent from the node device B to the node device A), the entry indicates to send the BIER packet to the node device A. In FIG. 1, an *A* identifier indicates to send the BIER packet to the node device A.

For the node device B, neighbor devices of the node device B include the edge node device A, the node device C, and the edge node device E. Next hops of BFER node devices whose BFR-ids are 1/2 are all the node device C, a BFER node device whose BFR-id is 3 is the edge node device E, and a BFER node device whose BFR-id is 4 is the edge node device A. A neighbor entry of the node device B is established as follows:

$$Nbr = C, FBM = 0011$$

$$Nbr = E, FBM = 0100$$

$$Nbr = A, FBM = 1000$$

For the node device C, neighboring node devices of the node device C include the node device B, the edge node device E, the edge node device F, and the edge node device D. A BFER node device whose BFR-id is 1 is the edge node device D, a BFER node device whose BFR-id is 2 is the edge node device F, a BFER node device whose BFR-id is 3 is the edge node device E, and a next hop of a BFER node device whose BFR-id is 4 is the node device B. A neighbor entry of the node device C is established as follows:

$$Nbr = D, FBM = 0001$$

$$Nbr = F, FBM = 0010$$

$$Nbr = E, FBM = 0100$$

$$Nbr = B, FBM = 1000$$

Neighboring node devices of the edge node device D include the node device C. Next hops of BFER node devices whose BFR-ids are 2/3/4 are all the node device C. A neighbor entry of the edge node device D is established as follows:

$$Nbr = C, FBM = 1110$$

Neighboring node devices of the edge node device E include the node device B and the node device C. Next hops of BFER node devices whose BFR-ids are 1/2 are all the node device C, and a next hop of a BFER node device whose BFR-id is 4 is the node device B. A neighbor entry of the edge node device E is established as follows:

$$Nbr = B, FBM = 1000$$

$$Nbr = C, FBM = 0011$$

Neighboring node devices of the edge node device F include the node device C. Next hops of BFER node devices whose BFR-ids are 1/3/4 are all the node device C. A neighbor entry of the edge node device F is established as follows:

$$Nbr = C, FBM = 1101$$

Figure 3:
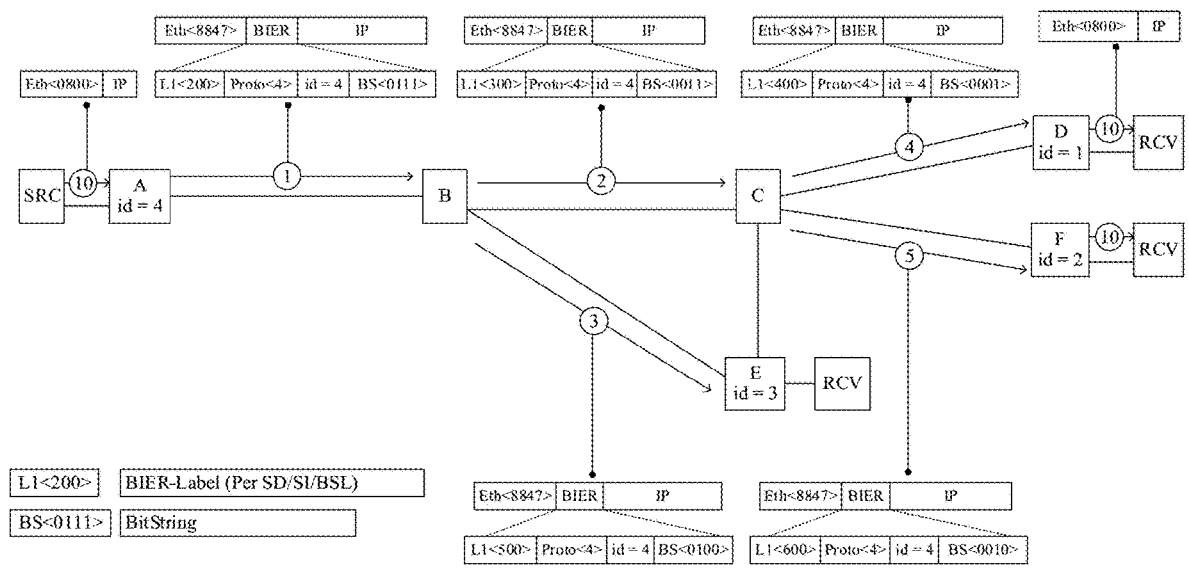
FIG. 3 is a schematic diagram of Bit Index Explicit Replication Multiprotocol Label Switching (BIER-MPLS) encapsulation and forwarding according to an embodiment of this application.

It should be noted that in this embodiment of this application, BIER-MPLS encapsulation and forwarding is used as an example. The first 20 bits of the BIER header are the MPLS label, and the label changes in a forwarding process. For example, as shown in FIG. 3, when sending a packet to the node device B, the node device A needs to encapsulate an MPLS label of the node device B. When sending a packet to the node device C, the node device B needs to encapsulate an MPLS label of the node device C. In an example shown in FIG. 3, only an example in which MPLS label allocated to the node devices A, B, C, D, E, and F are 100/200/300/400/500/600 is used. The labels need to be carried in the foregoing BIER encapsulation information and be flooded by using the IGP. Therefore, the node device A can determine the label of the node device B. A label used to identify the BIER information is also referred to as a BIER label (BIER-MPLS Label, RFC 8296).

In addition, the RFC 8296 further defines non-MPLS encapsulation, and the non-MPLS encapsulation is also referred to as BIER-ETH encapsulation, in which Ethertype=0xAB37 is used in an Ethernet header to indicate that the Ethernet header is followed by a BIER header. In this encapsulation manner, the first 20 bits of the BIER header are unique values in a Sub-domain referred to as the BIFT-id and do not need to be changed in the forwarding process. For example, BIFT-ids corresponding to node devices configured with <Sub-domain, BSL, SI> are set to 1, 2, 3, and 4. For example, when the node device A sends the packet to the node device B, and when the node device B sends the packet to the node device C, the first 20 bits in the BIER header are all 1, 2, 3, and 4, and do not need to be changed.

As shown in FIG. 3, the Proto field in the BIER header may be used to identify a format of a packet following the BIER header (namely, a Payload of the BIER packet). For example, common values of the Proto defined in the RFC 8296 are as follows:

When the Proto is 1, it indicates that the BIER header is followed by an MPLS label packet, for example, a BIER header+an MPLS label stack+an IP packet.

When the Proto is 2, it indicates that the BIER header is followed by an upstream MPLS label packet, for example, a BIER header+an upstream MPLS label stack+an IP packet.

When the Proto is 4, it indicates that the BIER header is followed by an Internet Protocol version 4 (IPv4) packet, for example, a BIER header+an IPv4 packet.

When the Proto is 6, it indicates that the BIER header is followed by an Internet Protocol version 6 (IPv6) packet, for example, a BIER header+an IPv6 packet.

The BFIR-id field in the BIER header indicates a BFIR node device from which the packet comes, and can be used to perform an RPF check during multicast forwarding. The RPF check determines whether the packet is sent from an expected node device or interface during multicast forwarding. If the packet is not sent from the expected node device or interface, the packet is discarded.

Figure 4:
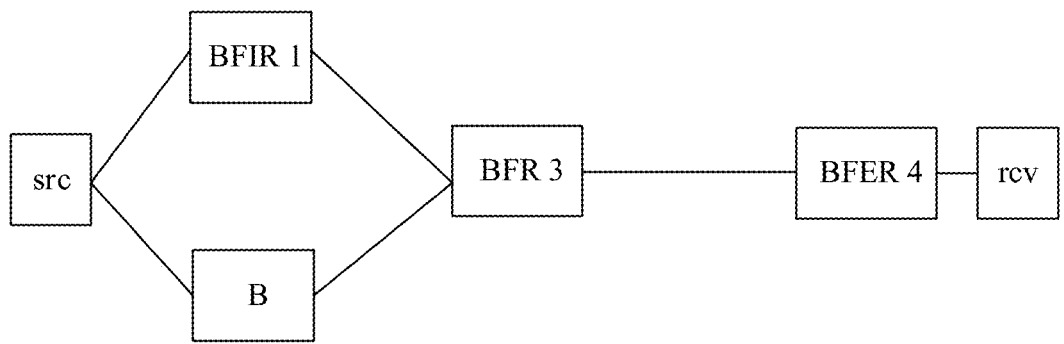
FIG. 4 is a schematic diagram of a structure of a network topology according to an embodiment of this application.

For example, networking shown in FIG. 4 is used as an example. An src in FIG. 4 is a multicast source or a router or switch connected to a multicast source. The multicast source may be connected to both BFIR 1 and BFIR 2 node devices, and is referred to as a multi-homed source. An rcv is a multicast receiver or a router or switch connected to a multicast receiver. The BFIR 1/the BFIR 2/a BFR 3/a BFER 4 form a BIER domain. The BFER 4 serves as an edge node device of the BIER domain, and supports a BIER signaling message but does not support BIER forwarding. The BFIR 1 and the BFIR 2 serve as ingress node devices, and both the BFIR 1 and the BFIR 2 can receive multicast data packets, encapsulate BIER headers, and send packets to the BFER 4. For example, the BFIR 1 and the BFIR 2 encapsulate the received multicast data packets into BIER packets, and send the packets to the BFR 3. The BFR 3 removes the BIER headers, and sends packets to the BFER 4. A payload of the BIER packet sent by the BFIR 1 or the BFIR 2 to the BFR 3 may be an IPv4 packet, an IPv6 packet, or an upstream MPLS label packet, and the BFER 4 may perform the RPF check on the received packet. For example, the BFER 4 may perform the RPF check by using the following method, to prevent the BFER 4 from sending two packets to the receiver.

For example, the BFER 4 may determine a target multicast upstream node device for a specific multicast data packet (S1, G1), where the target multicast upstream node device is an expected multicast upstream node device, S1 represents a packet source address, and G1 represents a packet group address. For example, the BFER 4 may be configured to expect to receive the multicast data packet (S1, G1) from the BFIR 2. In addition, the BFER 4 further establishes a correspondence of (S1, G1) and information about the expected upstream node device, for example, (S1, G1, BFIR 1 prefix), or (S1, G1, BFIR Sub-domain, BFIR BFR-id). For a received packet whose inner layer packet is (S1, G1) and whose outer layer is a BIER header, the BFER 4 may determine, based on a BIFT-id or a BIER MPLS label in the BIER header, a Sub-domain of the BIER packet to which the packet belongs; determines, based on the Sub-domain and the BFIR-id in the BIER header, a BFIR node device from which the packet actually comes; checks whether the BFIR node device from which the packet actually comes is the same as an expected BFIR node device; and determines whether an RPF check succeeds.

In other words, the BFER 4 may determine, based on the BIFT-id field and the BFIR-id field in the BIER header, the BFIR node device from which the packet actually comes; and determine, based on (S1, G1) in the packet, information about an upstream node device to which the packet is destined. The RPF check is performed based on whether the two pieces of information are consistent.

However, for a case in which the BFER 4 does not support BIER forwarding, as described in draft-ietf-bier-php-03, the BIER header is removed when the upstream node device is requested to send the multicast data packet, so that BIER is deployed in the network. Removing a BIER header in a packet sent to a BFER is referred to as BIER penultimate hop popping (PHP). After the BIER header is removed, the packet does not include the BIFT-id field and the BFIR-id field. Therefore, the RPF check cannot be performed on the BFER node device based on the BIER header.

After the BIER header is removed, if information about the BFIR node device can be obtained in the Payload of the BIER packet, the RPF check is performed on the BFER node device. For example, after the BIER header is removed, the RPF check may be further performed based on additional encapsulation information at a Payload layer following the BIER header. However, after the BIER header is removed, if the information about the BFIR node device cannot be obtained from the Payload of the BIER packet, the RPF check is not supported.

Therefore, embodiments of this application provide a packet processing method. In the method, when a tail node device, namely, an edge node device that does not support BIER packet forwarding, requests the BIER PHP, the RPF check is performed without depending on information in the BIER Payload. Instead, a label for the RPF check is allocated and advertised on a leaf node device that requests the BIER PHP, so that a node device that removes the BIER header can encapsulate the label after removing the BIER header. In this way, a problem that the RPF check cannot be performed when the BIER Payload is not the IPv4/the IPv6/the upstream MPLS label packet, and a problem of large encapsulation overheads or large number of used labels are resolved.

The method provided in embodiments of this application is applied to a first network device in a BIER communication network, and the BIER communication network includes the first network device and a second network device. For example, the BIER communication network may be a BIER domain, the first network device is a BFR node device in the BIER domain, and the second network device is an edge node device that is in the BIER domain and that does not support BIER packet forwarding. In embodiments of this application, the second network device may be used as a "pseudo BFER", for example, the BFER 4 in the network shown in FIG. 4. The second network device has a valid BFR-id. However, an upstream node device needs to remove a BIER header of a sent BIER multicast packet. In addition, the second network device is used as a BFR neighbor (BFR-NBR) when another BFR establishes a BIER forwarding table. For the first network device, when the first network device obtains, based on a routing table, that a next-hop BFR-NBR neighbor of the pseudo BFER is a pseudo BFER, the first network device establishes a BIFT entry in which a "BFR-NBR" is a pseudo BFER. One BIFT entry includes (BFR-NBR, F-BM), where the BFR-NBR is a BFR neighbor.

In addition, that the first network device obtains, based on the routing table, that the next-hop BFR-NBR neighbor of the pseudo BFER is the pseudo BFER includes the following two cases:

(1) The second network device is a BFR-NBR directly connected to the first network device, in other words, the second network device is directly connected to the first network device through a network interface.

(2) The second network device is a BFR-NBR indirectly connected to the first network device, in other words, there may be one or more non-BFR routers on a path from the first network device to the second network device.

Figure 5:
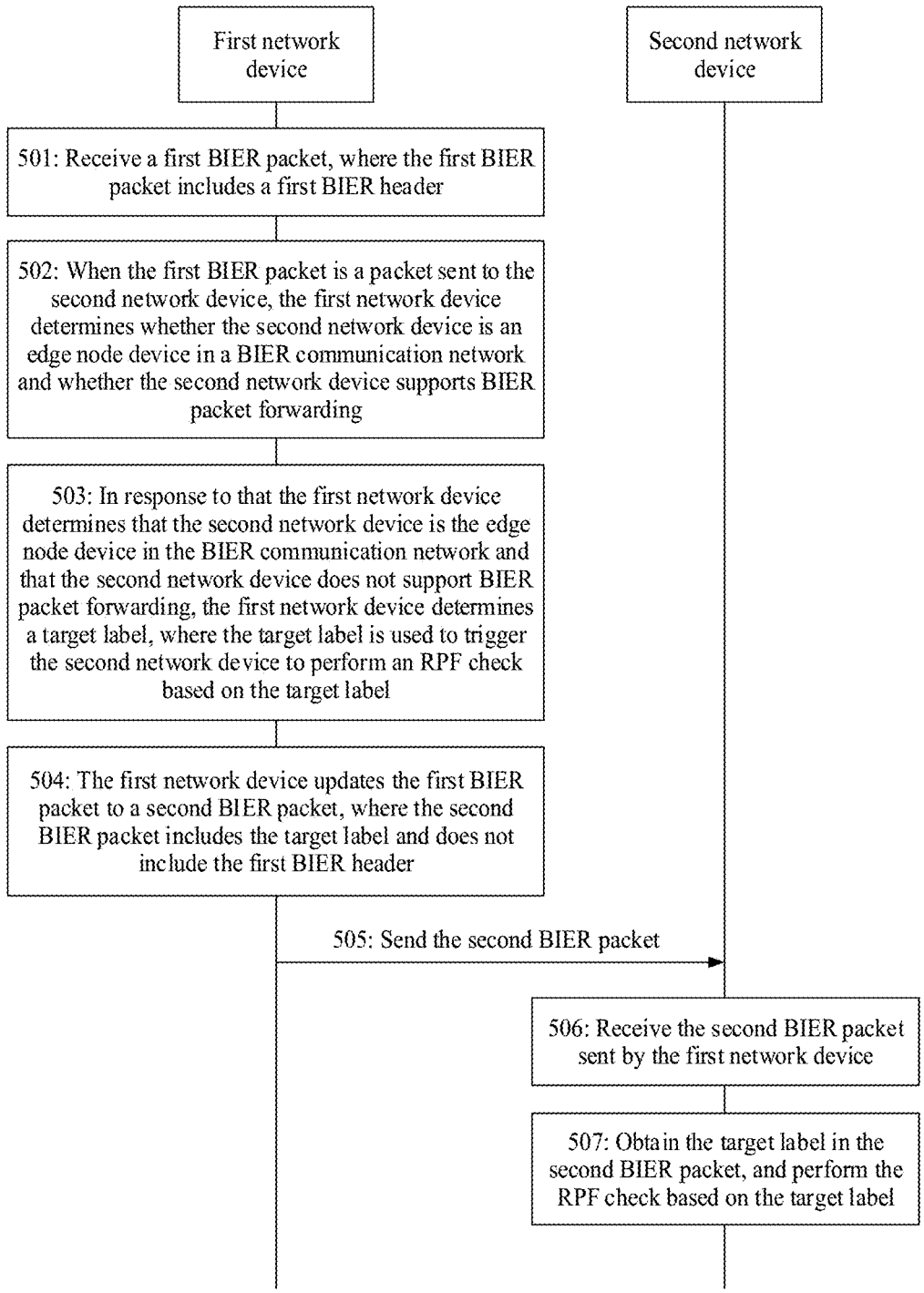
FIG. 5 is a flowchart of a packet processing method according to an embodiment of this application.

Regardless of which connection manner is used between the first network device and the second network device, refer to FIG. 5. The method includes the following processes:

501: The first network device receives a first BIER packet, where the first BIER packet includes a first BIER header.

In the method provided in this embodiment of this application, the first network device may receive the first BIER packet sent by a neighbor, and a bit string destination of the first BIER packet includes the second network device. For example, a BitString of the first BIER header includes a bit corresponding to a BFR-id of the second network device, for example, the bit is 1, where the bit is used to indicate that the second network device is a destination address.

An example in which in the network structure shown in FIG. 4, the first network device may be the BFR 3, and the BFR 3 may receive the first BIER packet sent by the BFIR 1 or the BFIR 2 is used.

502: When the first BIER packet is a packet sent to the second network device, the first network device determines whether the second network device is an edge node device in the BIER communication network and whether the second network device supports BIER packet forwarding.

Because the first BIER header of the first BIER packet includes information about the second network device, the first network device obtains the information about the second network device; and determines, based on the information about the second network device, whether the second network device is the edge node device in the BIER communication network and whether the second network device supports BIER packet forwarding.

For example, if a BFR-id of the first network device in the first BIER header is 1, the second network device is the edge node device. In addition, the second network device may request the first network device to remove a BIER header when sending a multicast data packet, and a PHP request carries the information about the second network device. Therefore, after receiving the first BIER packet, the first network device obtains the information about the second network device, and determine whether the second network device supports BIER packet forwarding.

503: In response to that the first network device determines that the second network device is the edge node device in the BIER communication network and that the second network device does not support BIER packet forwarding, the first network device determines a target label, where the target label is used to trigger the second network device to perform an RPF check based on the target label.

When the first network device determines that the second network device is the edge node device in the BIER communication network and that the second network device does not support BIER packet forwarding, in response to that the first network device determines that the second network device is the edge node device in the BIER communication network and that the second network device does not support BIER packet forwarding, the first network device determines the target label used for the RPF check, so that when the BIER packet does not include the first BIER header subsequently, the second network device can perform the RPF check based on the target label.

In an example embodiment, the target label includes but is not limited to the following two cases:

Case 1: The target label includes a label corresponding to a specified BFIR, where the label corresponding to the specified BFIR is allocated by the second network device, and the specified BFIR is a BFIR for sending the first BIER packet.

Case 2: The target label includes the label corresponding to the specified BFIR+a label used to indicate a packet type.

In addition to the foregoing case 1 and case 2, in the method provided in this embodiment of this application, the target label may further include a label of a unicast tunnel to the second network device. In other words, on a basis of case 1 or case 2, the following case 3 is further included:

Case 3: case 1+the label of the unicast tunnel to the second network device; or case 2+the label of the unicast tunnel to the second network device. For example, the label of the unicast tunnel to the second device may be: The first network device obtains a next hop to the second network device based on an IGP route, and then obtains a unicast label that is allocated on the next-hop and that corresponds to an IP address of the second network device.

For the foregoing several cases of the target label, a manner in which the first network device determines the target label includes but is not limited to the following three manners:

Manner 1: That the first network device determines the target label includes: The first network device obtains a first correspondence, where the first correspondence is a correspondence between information about the specified BFIR and the label corresponding to the specified BFIR; and determines, based on the first correspondence, the label corresponding to the specified BFIR.

Manner 1 provides a manner for determining the target label for the foregoing case 1. In Manner 1, the first network device may obtain the first correspondence in advance. Then, after receiving the first BIER packet, the first network device may obtain the information about the second network device, namely, the information about the specified BFIR, from the first BIER packet; and further can determine, based on the first correspondence, the label that is corresponding to the specified BFIR and that is corresponding to the information about the second network device. In this manner, the information about the second network device may be an identifier of the second network device.

Manner 2: That the first network device determines the target label includes: The first network device obtains a first correspondence and a second correspondence, where the first correspondence is a correspondence between information about the specified BFIR and the label corresponding to the specified BFIR, and the second correspondence is a correspondence between the packet type and the label used to indicate the packet type; and determines, based on the first correspondence, the label corresponding to the specified BFIR, and determines, based on the second correspondence, the label used to indicate the packet type.

Manner 2 provides a manner for determining the target label for the foregoing case 2. In Manner 2, the first network device may obtain the first correspondence and the second correspondence in advance. Then, after receiving the first BIER packet, the first network device may obtain the information about the second network device, namely, the information about the specified BFIR, from the first BIER packet; and further can determine, based on the first correspondence, the label that is corresponding to the specified BFIR and that is corresponding to the information about the second network device. In addition, the first network device can determine the packet type based on the first BIER packet, and further can determine, based on the second correspondence, the label that is corresponding to the packet type and that is used to indicate the packet type.

Manner 3: That the first network device determines the target label includes: The first network device obtains a third correspondence, where the third correspondence is a correspondence among a sub-domain, information about the specified BFIR, and the label corresponding to the specified BFIR; and determines, based on the third correspondence, the label corresponding to the specified BFIR.

Manner 3 provides a manner for determining the target label for the foregoing case 3. In Manner 3, the first network device may obtain the third correspondence in advance. Then, after receiving the first BIER packet, the first network device may obtain the information about the second network device, namely, the information about the specified BFIR, from the first BIER packet; and further can determine, based on the third correspondence, the label that is corresponding to the specified BFIR and that is corresponding to the information about the second network device. In this manner, the information about the second network device may be the sub-domain+an identifier of the specified BFIR.

504: The first network device updates the first BIER packet to a second BIER packet, where the second BIER packet includes the target label and does not include the first BIER header.

For example, when updating the first BIER packet to the second BIER packet, the first network device may remove the BIER header of the first BIER packet, and encapsulate the target label in the BIER packet whose BIER header is removed, to obtain the second BIER packet.

A manner in which the first network device removes the BIER header of the first BIER packet is not limited in this embodiment of this application. Because step 503 includes but is not limited to three manners of determining the target label, if the target label is determined in step 503 by using manner 1, in this step, the target label determined in manner 1 is encapsulated into the BIER packet whose BIER header is removed, to obtain the second BIER packet. If the target label is determined in manner 2 in step 503, in this step, the target label determined in manner 2 is encapsulated into the BIER packet whose BIER header is removed, to obtain the second BIER packet. If the target label is determined in manner 3 in step 503, in this step, the target label determined in manner 3 is encapsulated into the BIER packet whose BIER header is removed, to obtain the second BIER packet.

505: The first network device sends the second BIER packet to the second network device.

After updating the second BIER packet, the first network device sends the second BIER packet to a next hop.

It should be noted that, as described in step 501, because the bit string destination of the first BIER packet includes the second network device, and the first network device may be directly connected to the second network device. Therefore, the next hop of the first network device is the second network device, and the first network device directly sends the second BIER packet to the second network device.

In an example embodiment, the first network device may be indirectly connected to the second network device. Therefore, the next hop of the first network device is not the second network device. In this case, the first network device sends the second BIER packet to the next hop of the first network device, and the next-hop of the first network device sends the second BIER packet to the second network device.

506: The second network device receives the second BIER packet sent by the first network device.

As described in step 505, because the first network device may be directly connected to the second network device, the second network device may receive the second BIER packet from the first network device. In addition, because the first network device may be indirectly connected to the second network device, the second network device may receive, from a neighbor of the first network device, the second BIER packet sent by the first network device. Regardless of a case in which the second BIER packet is received, the second BIER packet is encapsulated with the target label used for the RPF check, and does not include the first BIER header.

507: The second network device obtains the target label in the second BIER packet, and performs the RPF check based on the target label.

In an example embodiment, because the target label has a plurality of forms, that the second network device in this embodiment of this application performs the RPF check based on the target label includes but is not limited to the following several manners:

Manner 1: That the RPF check is performed based on the target label includes: determining the information about the specified BFIR based on the label corresponding to the specified BFIR and the first correspondence, where the first correspondence is the correspondence between the information about the specified BFIR and the label corresponding to the specified BFIR; determining information about a first target BFIR based on the second BIER packet, where the information about the first target BFIR indicates information about a network device that is corresponding to a payload of the second BIER packet and that is expected by the second network device; and comparing the information about the specified BFIR with the information about the first target BFIR, and determining an RPF check result based on a comparison result.

In an example embodiment, before the second BIER packet is received, the method further includes: obtaining the first correspondence between the information about the specified BFIR and the label corresponding to the specified BFIR, and advertising the first correspondence.

In addition, in the manner 1, in an example embodiment, the method further includes: determining, based on the second correspondence, the label used to indicate the packet type, where the second correspondence is the correspondence between the packet type and the label used to indicate the packet type; and determining the packet type based on the label used to indicate the packet type.

In an example embodiment, before the second BIER packet is received, the method further includes: obtaining the second correspondence between the packet type and the label used to indicate the packet type, and advertising the second correspondence.

Manner 2: That the RPF check is performed based on the target label includes: determining the sub-domain and the information about the specified BFIR based on the label corresponding to the specified BFIR and the third correspondence, where the third correspondence is the correspondence among the sub-domain, the information about the specified BFIR, and the label corresponding to the specified BFIR; determining information about a second target BFIR based on the second BIER packet, where the information about the second target BFIR indicates information about a network device that is corresponding to a payload of the second BIER packet and that is expected by the second network device, and the information about the second target BFIR includes the sub-domain and a BFIR identifier; and comparing the sub-domain, the information about the specified BFIR, and the information about the second target BFIR, and determining an RPF check result based on a comparison result.

In an example embodiment, before the second BIER packet is received, the method further includes: obtaining the third correspondence among the sub-domain, the information about the specified BFIR, and the label corresponding to the specified BFIR, and advertising the third correspondence.

It should be noted that regardless of the first correspondence, the second correspondence, and the third correspondence, BIER information may include attributes of one or more Sub-domains, for example, a BFR-id of a node device in a Sub-domain, and an IGP algorithm (IPA) and a BIER path algorithm (BAR) used by the Sub-domain. The BIER information further includes encapsulation information in each Sub-domain. For example, a Sub-domain=X may have encapsulation information about BSL=256, where a Label value is a start label of a label block with a same BSL whose minimum SI is 0 and whose maximum SI is a value of a Max SI field. For example, if BSL=256 has information about three sets of SI=0/1/2, a Label or a BIFT-id represents a label of <SD=X, BSL=256, SI=0>, the label value plus one represents a label of <SD=X, BSL=256, SI=1>, and the label value plus two represents a label of <SD=X, BSL=256, SI=2>. One Sub-domain may have encapsulation information about a plurality of BSLs, for example, the Sub-domain may have both encapsulation information about BSL=256 and encapsulation information about BSL=128.

After determining the correspondences, the second network device may advertise the correspondences when advertising the BIER information. For example, the second network device allows a route that carries the PHP Request to carry the foregoing information, namely, the correspondences, and the advertised message may further carry the information about the second network device, for example, the IP address of the second network device.

Figure 6A:
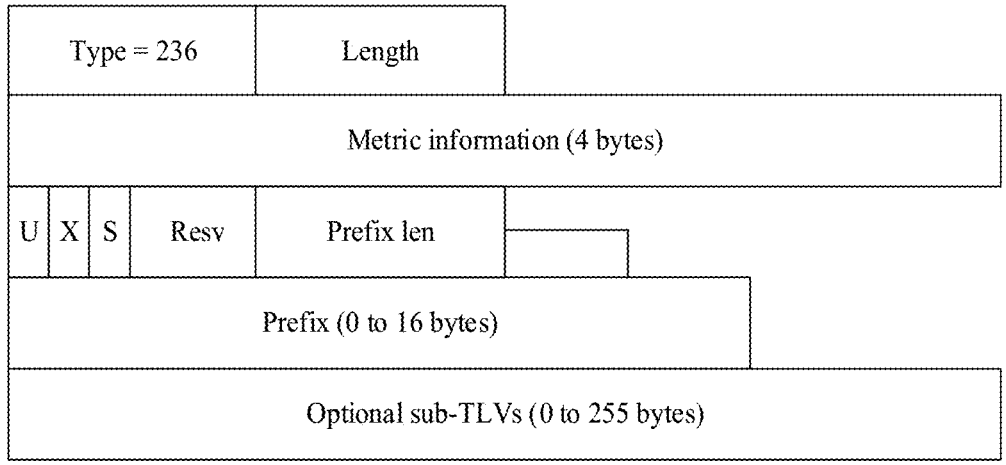
FIG. 6A, FIG. 6B, and FIG. 6C are a schematic diagram of a format of a BIER packet according to an embodiment of this application.
Figure 6B:
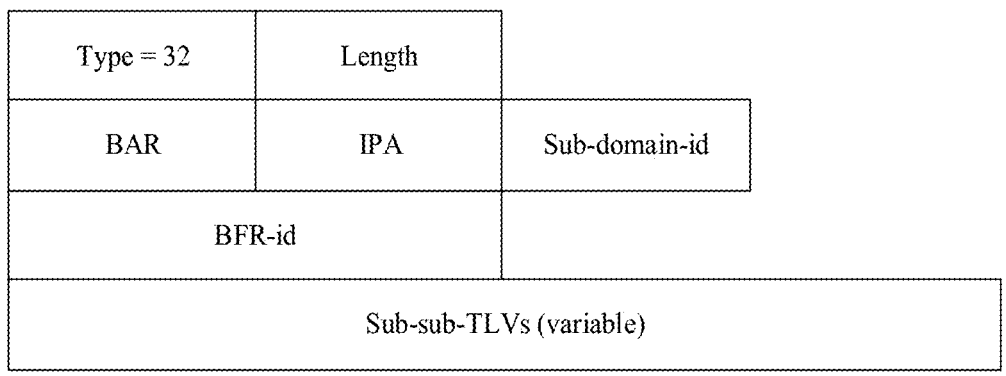
Figure 6C:
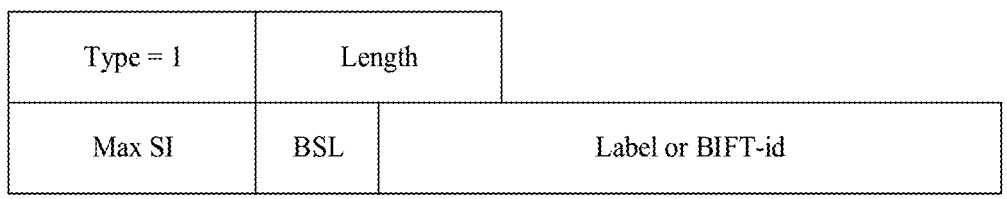

For example, a packet format in which an IS-IS carries each target label is used as an example in FIG. 6A, FIG. 6B, and FIG. 6C. In FIG. 6A, a TLV of Type=236 carries an IP address of the BFER 4 node device, for example, an IPv6 address of the BFER 4 is carried in a Prefix field. A U flag indicates whether route advertisement is from a high area to a low area. For example, if the route advertisement is from the high area to the low area, the U flag is a first value, for example, the first value is 1. If the route advertisement is not from the high area to the low area, the U flag is a second value, for example, the second value is 0. An X flag is an external flag. When a route is an external route, a first value is set, for example, the first value is 1. An S flag is a flag indicating whether a Sub-TLV is included. If the Sub-TLV is included in the TLV, the flag is the first value, for example, the first value is 1. If the Sub-TLV is not included in the TLV, the flag is a second value, for example, the second value is 0.

In FIG. 6B, a TLV of Type=32 carries a Sub-domain-id of the BFER 4 node device, and a sub-sub-TLVs field of the TLV may have a sub-TLV, for example, a sub-TLV carrying the PHP Request (for example, a TLV defined in draft-ietf-bier-php-03). In FIG. 6C, a TLV of Type=1 carries a correspondence between a BFIR-Prefix and an RPF-Label. For example, there may be one or more correspondences. In addition, a Length field may be used to learn of a quantity of correspondences.

The TLV of Type=32 is a sub-TLV of the TLV of Type=236, namely, an Optional sub-TLVs field located in the TLV of Type=236. In addition, the TLV of Type=X may alternatively be a sub-TLV of the TLV of Type=236, namely, an Optional sub-TLVs field located in the TLV of Type=236.

According to the method provided in this embodiment of this application, after the first network device receives the first BIER packet that includes the first BIER header and is sent to the second network device, for a case in which the second network device is the edge node device and does not support BIER packet forwarding, the first network device updates the first BIER packet to the second BIER packet that includes the target label used for the RPF check and does not include the first BIER header, so that the edge node device that does not support BIER packet forwarding, namely, the second network device, can perform the RPF check without depending on information in the payload. This can improve reliability of the RPF check, and resolve a problem of large encapsulation overheads or a large number of used labels.

For ease of understanding of the foregoing packet processing method, the following several examples are used for description.

Figure 7:
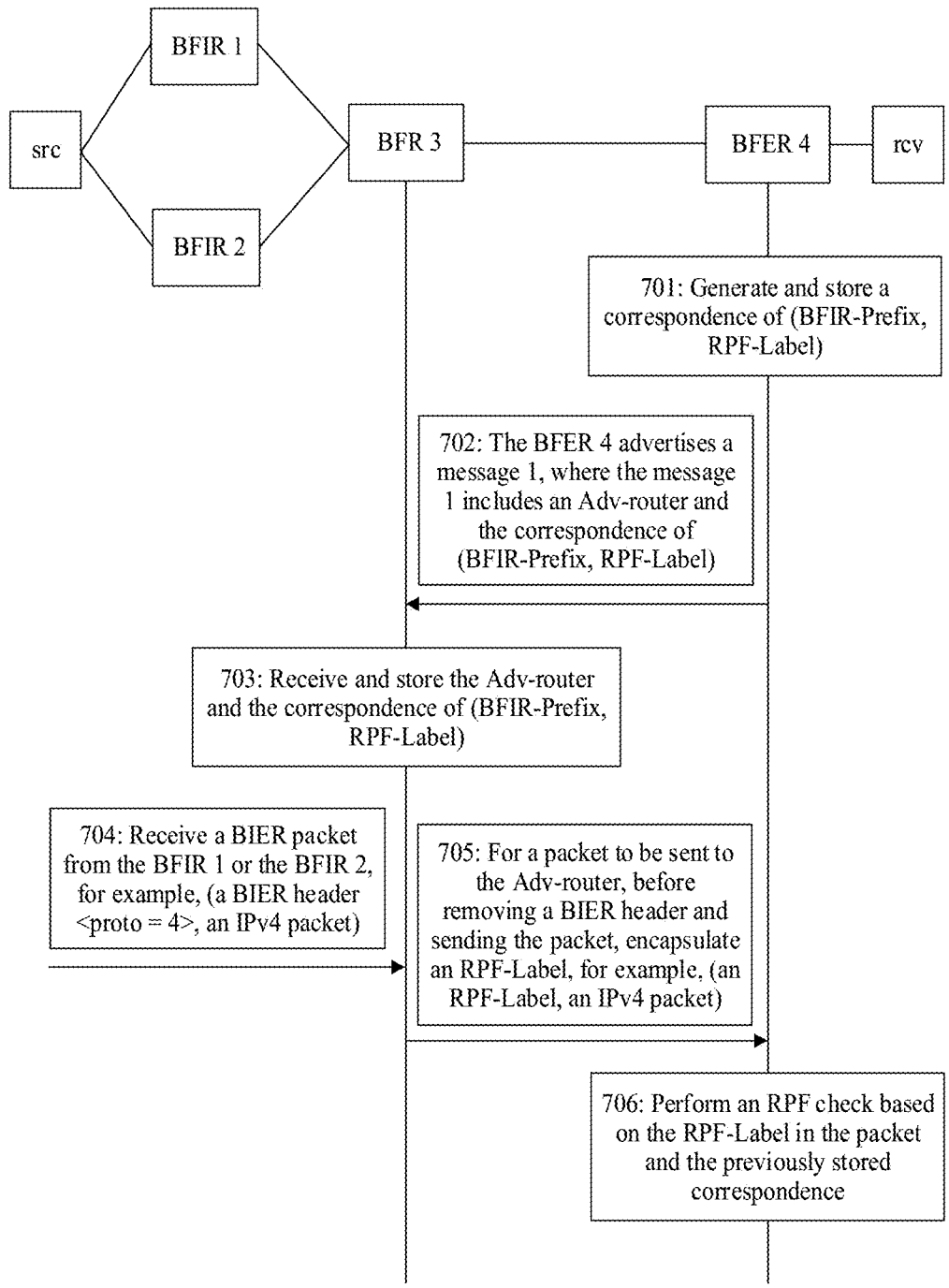
FIG. 7 is a schematic interaction diagram of a packet processing method according to an embodiment of this application.

First, an example in which in the network shown in FIG. 4, the first network device is the BFR 3 in FIG. 4, and the second network device is the BFER 4 in FIG. 4 is used, and a packet processing process provided in this embodiment of this application shown in FIG. 7 is used as an example. In this embodiment, an example in which the target label is determined in manner 1 in step 502 in the embodiment shown in FIG. 5 and the information about the specified BFIR is a BFIR-Prefix is used for description. For example, the packet processing method includes the following processes:

701: The BFER 4 generates and stores a correspondence of (BFIR-Prefix, RPF-Label).

In an example embodiment, information about BFIR node devices on which the RPF check is performed may be configured on the BFER 4 node device. For example, the following information is configured on the BFER 4 node device:

---

Bier
    Php
        Apply rpf-label Bfir-prefix 1.1.1.1
        Apply rpf-label Bfir-prefix 2.2.2.2
    Sub-domain 1
        xxx
    Sub-domain 2
        xxx

---

Apply rpf-label Bfir-prefix 1.1.1.1 indicates that a label for the RPF needs to be allocated to a node device whose BFIR-Prefix is 1.1.1.1, so that the BFER 4 node device can perform the RPF.

Similarly, Apply rpf-label Bfir-prefix 2.2.2.2 indicates that a label for the RPF needs to be allocated to a node device whose BFIR-Prefix is 2.2.2.2, so that the BFER 4 node device can perform the RPF.

702: The BFER 4 advertises a message 1, where the message 1 includes an Adv-router and the correspondence of (BFIR-Prefix, RPF-Label).

For example, the Adv-router may be the IP address of the BFER 4. In addition, the message 1 carries the following information:

(BFIR–Prefix = 1.1.1.1, Label = 1001); and (BFIR–Prefix = 2.2.2.2, Label = 1002).

1.1.1.1 is an IP address of the BFIR 1, and 2.2.2.2 is an IP address of the BFIR 2.

For the foregoing information, after the BFER 4 establishes the corresponding correspondence, the BFER 4 may advertise the correspondence when advertising the BIER information. For example, the BFER 4 allows the route that carries the PHP Request to carry the foregoing information, namely, the correspondence, and the advertised message may further carry an IP address 4.4.4.4 or an IPv6 address of the BFER 4.

For example, a packet format in which the IS-IS carries a BFIR-Prefix label is used as an example in FIG. 8A, FIG. 8B, and FIG. 8C. In in FIG. 8A, a TLV of Type=236 carries the IP address of the BFER 4 node device, for example, the IPv6 address of the BFER 4 is carried in a Prefix field. In FIG. 8B, a TLV of Type=32 carries the Sub-domain-id of the BFER 4 node device, and a sub-sub-TLVs field of the TLV may have a sub-TLV, for example, the sub-TLV carrying the PHP Request (for example, the TLV defined in draft-ietf-bier-php-03). In FIG. 8C, a TLV of Type=X carries the correspondence between the BFIR-Prefix and the RPF-Label. For example, there may be one or more correspondences. In addition, a Length field may be used to learn of a quantity of correspondences.

The TLV of Type=32 is a sub-TLV of the TLV of Type=236, namely, an Optional sub-TLVs field located in the TLV of Type=236. In addition, the TLV of Type=X may alternatively be a sub-TLV of the TLV of Type=236, namely, an Optional sub-TLVs field located in the TLV of Type=236.

703: The BFR 3 node device receives the information advertised by the BFER 4, and stores the correspondence.

In an example embodiment, the BFR 3 establishes forwarding information based on the information advertised by the BFER 4, and forwards a received packet based on the forwarding information. For example, the BFR 3 establishes the following forwarding information based on the information advertised by the BFER 4: forwarding information 1: (a BIFT-id of a BIER packet, a corresponding BFR-NBR, a PHP-Request, an FBM), where the forwarding information 1 corresponds to one entry: (the BIFT-id of the BIER packet=X, the corresponding BFR-NBR=4.4.4.4, the PHP-Request=True, the FBM); forwarding information 2: (a BIFT-id of a BIER packet, a BFIR-id of a BIER packet, a BFIR-Prefix of a BIER packet), where the forwarding information 2 corresponds to the following two entries: (the BIFT-id of the BIER packet=X, the BFIR-id of the BIER packet=1, the BFIR-Prefix=1.1.1.1); and (the BIFT-id of the BIER packet=X, the BFIR-id of the BIER packet=2, the BFIR-Prefix=2.2.2.2); and forwarding information 3: a label that is used for the RPF and that is allocated by the BFER 4<1.1.1.1> to each BFIR-Prefix, where the forwarding information 3 corresponds to the following two entries: (Adv-Router=4.4.4.4, BFIR-Prefix=1.1.1.1, Label=1001); and (Adv-Router=4.4.4.4, BFIR-Prefix=2.2.2.2, Label=1002).

The BFR 3 determines, based on the forwarding information 1, that a packet whose BIFT-id is X needs to be copied to 4.4.4.4 and a BIER header of the packet needs to be removed. The BFR 3 determines, based on the forwarding information 2 and the forwarding information 3, that a packet whose BIFT-id is X and BFIR-id is 1 need to be encapsulated with the label 1001 corresponding to (Adv-Router=4.4.4.4, BFR-Prefix=1.1.1.1), namely, a label allocated by a node device 4.4.4.4 to the BFR-Prefix<1.1.1.1> for the RPF check. The BFR 3 determines that a packet whose BIFT-id is X and BFIR-id is 2 needs to be encapsulated with the label 1002 corresponding to (Adv-Router=4.4.4.4, BFIR-Prefix=2.2.2.2), namely, a label allocated by the node device 4.4.4.4 to the BFIR-Prefix<2.2.2.2> for the RPF check.

704: The BFR 3 receives the BIER packet, where a Proto in the BIER packet is 4.

The BIER packet may come from the BFIR 1 or the BFIR 2. For example, the BIER packet may be in the following format: a BIER header (Proto=4)+an inner IPv4 packet, where the BIER header may be preceded by a link layer header, for example, an Ethernet header. Herein, only an example in which a listed packet does not include the link layer header is used for description.

705: For the packet to be sent to the BFER 4, before removing the BIER header and sending the packet, the BFR 3 encapsulates the RPF-Label, and then sends the packet to the BFER 4.

For example, the packet sent by the BFR 3 may be in the following format: a label stack (including the label 1001)+an inner IPv4 packet, where the label stack may be preceded by the link layer header, for example, the Ethernet header. Herein, only the example in which the listed packet does not include the link layer header is used for description.

In an example embodiment, the packet sent by the BFR 3 may also be in the following format: a label stack (including the label of the unicast tunnel to the BFER 4 and the label 1001)+an inner IPv4 packet.

706: The BFER 4 performs the RPF check based on the RPF-Label in the packet and the previously stored correspondence.

After receiving the BIER packet, the BFER 4 processes the label stack and determines whether to forward the packet based on a processing result.

In an example embodiment, the BFER 4 receives the BIER packet. When processing the label stack, because the label stack includes 1001 or 1002, the BFER 4 determines, based on 1001 or 1002 in the label stack, that the packet comes from 1.1.1.1 or 2.2.2.2. This is determined based on the correspondence established on the BFER 4 as described in step 701 above.

Then, the BFER 4 processes the IPv4 or IPv6 packet, and performs the RPF by using the determined packet from 1.1.1.1 or 2.2.2.2. For example, the BFER 4 queries a multicast forwarding table based on a source address and a destination address in the inner IPv4 packet, to determine that the packet is expected to come from an identifier 1 of the BFIR 1, and determine that the packet actually comes from an identifier 2 of the BFIR 1 based on that the foregoing determined packet actually comes from the BFIR-Prefix=1.1.1.1. If the identifier 1 and the identifier 2 are the same, the RPF check succeeds. If the identifier 1 and the identifier 2 are different, the RPF check fails.

For example, in a process in which the BFER 4 obtains the identifier 2 of the BFIR 1 based on the BFIR-Prefix=1.1.1.1, the BFER 4 may obtain a correspondence between the BFIR-Prefix and the identifier 2 from a BGP multicast virtual private network (MVPN) routing message based on a method described in the RFC 8556, where the identifier 2 is an IP address of the BFIR 1, and may be the same as or different from the BFIR-Prefix.

For example, the BGP MVPN routing message may be an inclusive provider multicast service interface auto-discovery (I-PMSI A-D) routing message or a selective provider multicast service interface auto-discovery (S-PMSI A-D) routing message included in an MVPN, and the BGP MVPN routing message includes (the IP address of the BFIR 1, the Sub-domain, the BFIR-id, the BFIR-Prefix). The IP address of the BFIR 1 and the BFIR-Prefix may be the same or different.

Figure 9:
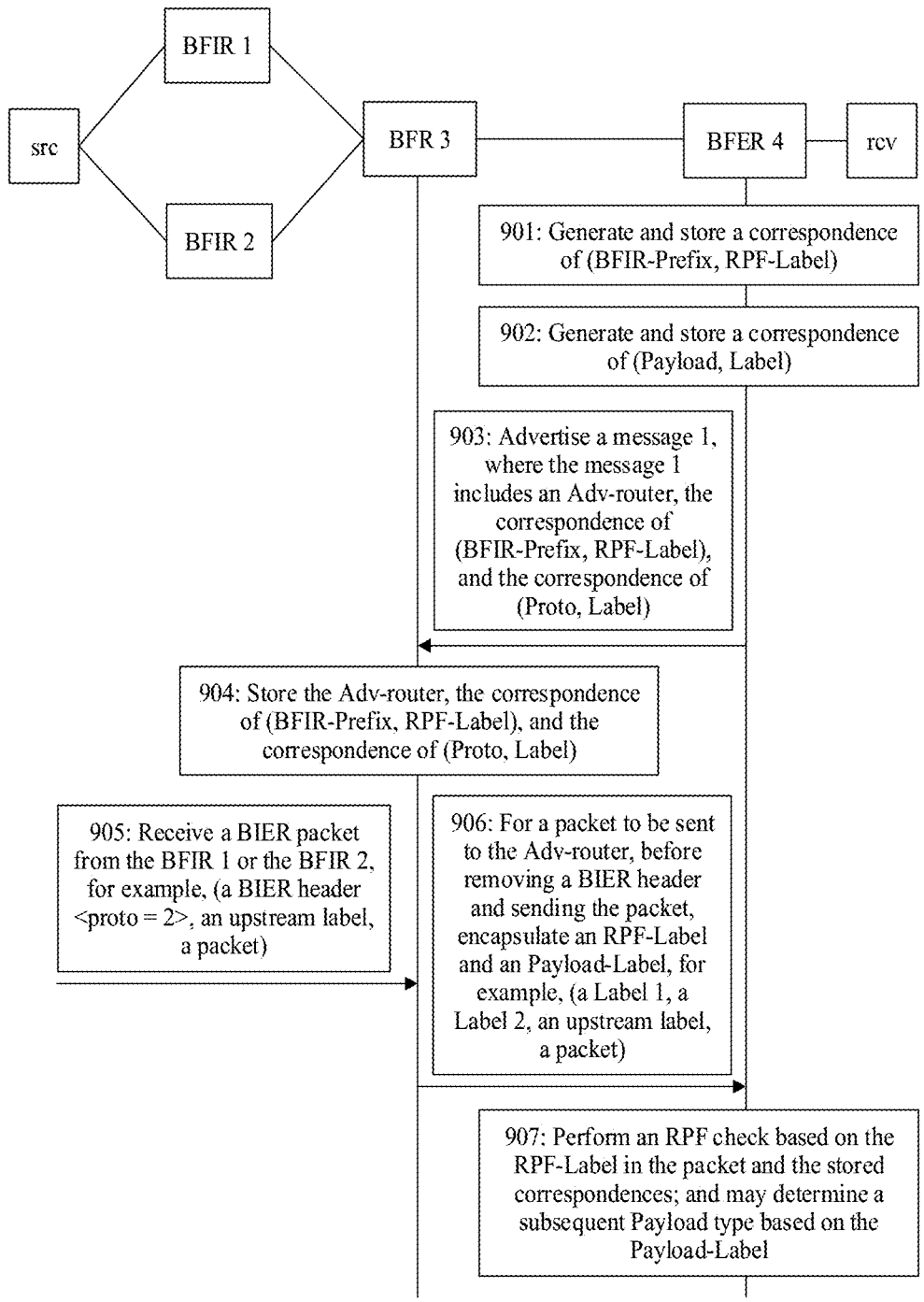
FIG. 9 is a schematic interaction diagram of a packet processing method according to an embodiment of this application.

Next, an example in which in the network shown in FIG. 4, the first network device is the BFR 3 in FIG. 4, and the second network device is the BFER 4 in FIG. 4 is used, and a packet processing process provided in this embodiment of this application shown in FIG. 9 is used as an example. In this embodiment, an example in which the target label is determined in manner 2 in step 502 in the embodiment shown in FIG. 5 and the information about the specified BFIR is a BFIR-Prefix is used for description. The target label in this embodiment is different from the foregoing target label. In the packet processing method provided in this embodiment of this application, on a basis of the target label provided in the foregoing embodiment, another label is additionally used to indicate a subsequent Payload type. In other words, in this embodiment, two layers of labels are used in the packet. One layer is used to indicate a label used by an ingress node device for the RPF check, and the other layer is used to indicate the subsequent Payload type. As shown in FIG. 9, the method provided in this embodiment of this application includes the following processes:

901: The BFER 4 generates and stores the correspondence of (BFIR-Prefix, RPF-Label).

902: The BFER 4 generates and stores a correspondence of (Payload, Label).

In an example embodiment, when the foregoing steps 901 and 902 are implemented, the information about the BFIR node devices on which the RPF check is performed and information about a Payload type that may be supported may be configured on the BFER 4 node device. For example, the following information is configured on the BFER 4:

---

Bier
  Php
    Apply rpf-label Bfir-prefix 1.1.1.1
    Apply rpf-label Bfir-prefix 2.2.2.2
  Apply payload-label proto 2
    Sub-domain 1
      xxx
    Sub-domain 2
      xxx

---

Apply rpf-label Bfir-prefix 1.1.1.1 indicates that the label for the RPF needs to be allocated to the node device whose BFIR-Prefix is 1.1.1.1, so that the BFER 4 node device can perform the RPF.

Similarly, Apply rpf-label Bfir-prefix 2.2.2.2 indicates that the label for the RPF needs to be allocated to the node device whose BFIR-Prefix is 2.2.2.2, so that the BFER 4 node device can perform the RPF.

Apply payload-label proto 2 indicates that another label is allocated to a Payload type of BIER Proto=2 (in other words, the Payload is an upstream label packet) to indicate the Payload type, for example, to indicate that the label is followed by a packet whose label is an upstream MPLS label. An MPLS label in the upstream MPLS label packet further indicates a format of a subsequent packet, for example, an IPv4 packet or an IPv6 packet.

903: The BFER 4 advertises a message 1, where the message 1 includes the Adv-router, the correspondence of (BFIR-Prefix, RPF-Label), and the correspondence of (Payload, Label).

For example, the Adv-router may be the IP address of the BFER 4. In addition, the message 1 carries the following information:

(BFIR–Prefix = 1.1.1.1, Label = 1001);

(BFIR–Prefix = 2.2.2.2, Label = 1002); and (Proto = 2, a label 1010).

The first two pieces of information in the message 1 may be in a type-length-value (TLV) format, for example, a TLV of type=x. The last piece of information may be a TLV of another type, for example, a TLV of type=y.

1.1.1.1 is the IP address of the BFIR 1, and 2.2.2.2 is the IP address of the BFIR 2. Proto=2 indicates the Payload type of BIER Proto=2, namely, the packet with the upstream MPLS label.

After the BFER 4 establishes the foregoing corresponding correspondences, when the BFER 4 advertises the BIER information, the BFER 4 allows the route carrying the PHP Request to carry the foregoing information, and the advertised message may further carry the IP address 4.4.4.4 or the IPv6 address of the BFER 4. For example, a packet format in which the IS-IS carries a BFIR-Prefix label is used as an example in FIG. 10A, FIG. 10B, FIG. 10C, and FIG. 10D.

In FIG. 10A, a TLV of Type=236 carries the IP address of the BFER 4 node device, for example, the IPv6 address of the BFER 4 is carried in a Prefix field. In FIG. 10B, a TLV of Type=32 carries the Sub-domain-id of the BFER 4 node device, and a sub-sub-TLVs field of the TLV may have a sub-sub-TLV, for example, a sub-sub-TLV carrying the PHP Request (for example, the TLV defined in draft-ietf-bier-php-03). In FIG. 10C, a TLV of Type=X carries the correspondence between the BFIR-Prefix and the RPF-Label. For example, there may be one or more correspondences. In addition, a Length field may be used to learn of a quantity of correspondences. In FIG. 10D, a TLV of Type=Y carries a correspondence between the Payload Type and the Payload Label, for example, there may be a Payload Type of Proto=2 and a corresponding Label.

The TLV of Type=32 is a sub-TLV of the TLV of Type=236, namely, an Optional sub-TLVs field located in the TLV of Type=236. The TLV of Type=X may also be a sub-TLV of the TLV of Type=236, namely, an Optional sub-TLVs field located in the TLV of Type=236. The TLV of Type=Y may also be a sub-TLV of the TLV of Type=236, namely, an Optional sub-TLVs field located in the TLV of Type=236.

904: The BFR 3 node device receives the information advertised by the BFER 4, and stores the correspondences.

In an example embodiment, the BFR 3 receives the information advertised by the BFER 4, stores the correspondences, establishes forwarding information, and forwards a received packet. For example, the following forwarding information is created: forwarding information 1: (a BIFT-id of a BIER packet, a corresponding BFR-NBR, a PHP-Request, an FBM), where the forwarding information 1 corresponds to the following entries: (the BIFT-id of the BIER packet=X, the corresponding BFR-NBR=4.4.4.4, the PHP-Request=True, the FBM); forwarding information 2: (a BIFT-id of a BIER packet, a BFIR-id of a BIER packet, a BFIR-Prefix of a BIER packet), where the forwarding information 2 has the following two entries: (the BIFT-id of the BIER packet=X, the BFIR-id of the BIER packet=1, the BFIR-Prefix=1.1.1.1); and (the BIFT-id of the BIER packet=X, the BFIR-id of the BIER packet=2, the BFIR-Prefix=2.2.2.2); forwarding information 3: a label that is used for the RPF and that is allocated by the BFER 4<1.1.1.1> to each BFIR-Prefix, where the forwarding information 3 corresponds to the following two entries: (Adv-Router=4.4.4.4, BFIR-Prefix=1.1.1.1, Label=1001); and (Adv-Router=4.4.4.4, BFIR-Prefix=2.2.2.2, Label=1002);

and forwarding information 4: a label that is allocated by BFER 4<1.1.1.1> to Proto=2 and that is used to identify a subsequent packet type, where (Adv-Router=4.4.4.4, Proto=2, Label=1010).

The BFR 3 determines, based on the forwarding information 1, that the packet whose BIFT-id is X needs to be copied to 4.4.4.4 and the BIER header of the packet needs to be removed. The BFR 3 determines, based on the forwarding information 2, the forwarding information 3, and the forwarding information 4, that a packet whose BIFT-id is X, BFIR-id is 1, and Proto is 2 needs to be encapsulated with the label 1001 and the label 1010 corresponding to (Adv-Router=4.4.4.4, BFR-Prefix=1.1.1.1, Proto=2), for example, a label stack in which 1001 is in the front and 1010 is in the rear. The BFR 3 determines that a packet whose BIFT-id is X, BFIR-id is 2, and Proto is 2 needs to be encapsulated with the label 1002 and the label 1010 corresponding to (Adv-Router=4.4.4.4, BFR-Prefix=2.2.2.2, Proto=2), for example, a label stack in which 1002 is in the front and 1010 is in the rear.

905: The BFR 3 receives the BIER packet.

For example, the BIER packet of Proto=2 received by the BFR 3 may be in the following format: a BIER header (Proto=2)+an upstream MPLS label+an inner IP packet, where the BIER header may be preceded by the link layer header, for example, the Ethernet header. Herein, only an example in which the listed packet does not include the link layer header is used for description.

906: For the packet to be sent to the BFER 4, before removing the BIER header and sending the packet, the BFR 3 encapsulates the RPF-Label and the Payload-Label, and then sends the packet to the BFER 4.

For example, the packet sent by the BFR 3 to the BFER 4 may be in the following format: a label stack (including the label 1001 and the label 1010)+an upstream MPLS label+an inner IP packet, where the label stack may be preceded by the link layer header, for example, the Ethernet header. Herein, only the example in which the listed packet does not include the link layer header is used for description.

In an example embodiment, the packet sent by the BFR 3 to the BFER 4 may also be in the following format: a label stack (including the label of the unicast tunnel to the BFER 4, the label 1001, and the label 1010)+an upstream MPLS label+an inner IP packet, where the inner IP packet may be the IPv4 packet or the IPv6 packet, and a format of the inner IP packet may be indicated by the upstream MPLS label.

907: The BFER 4 performs the RPF check based on the RPF-Label in the packet and the stored correspondences, and may further determine the subsequent Payload type based on the Payload-Label.

In an example embodiment, after receiving the BIER packet, the BFER 4 first processes the label stack. For example, because the label stack includes 1001 and 1010, it is determined, based on 1001 in the label stack, that the packet comes from 1.1.1.1; and determined, based on 1010 in the label stack, that the format following the packet is the upstream label packet. This is determined based on the correspondences established on the BFER 4 as described in step 1 above.

Then, the BFER 4 processes a part "an upstream assigned VPN label+an IP packet", and performs the RPF by using the packet from 1.1.1.1 identified above. For example, the BFER 4 queries the multicast forwarding table based on the source address and the destination address in the inner IPv4 packet, to determine that the packet is expected to come from the identifier 1 of the BFIR 1, and determine that the packet actually comes from the identifier 2 of the BFIR 1 based on that the foregoing determined packet actually comes the BFIR-Prefix=1.1.1.1. If the identifier 1 and the identifier 2 are the same, the RPF check succeeds. If the identifier 1 and the identifier 2 are different, the RPF check fails. The process in which the BFER 4 obtains the identifier 2 of the BFIR 1 based on the BFIR-Prefix=1.1.1.1, the BFER 4 may obtain the correspondence between the BFIR-Prefix and the identifier 2 from the BGP MVPN routing message based on the method described in the RFC 8556, where the identifier 2 is the IP address of the BFIR 1, and may be the same as or different from the BFIR-Prefix.

Figure 11:
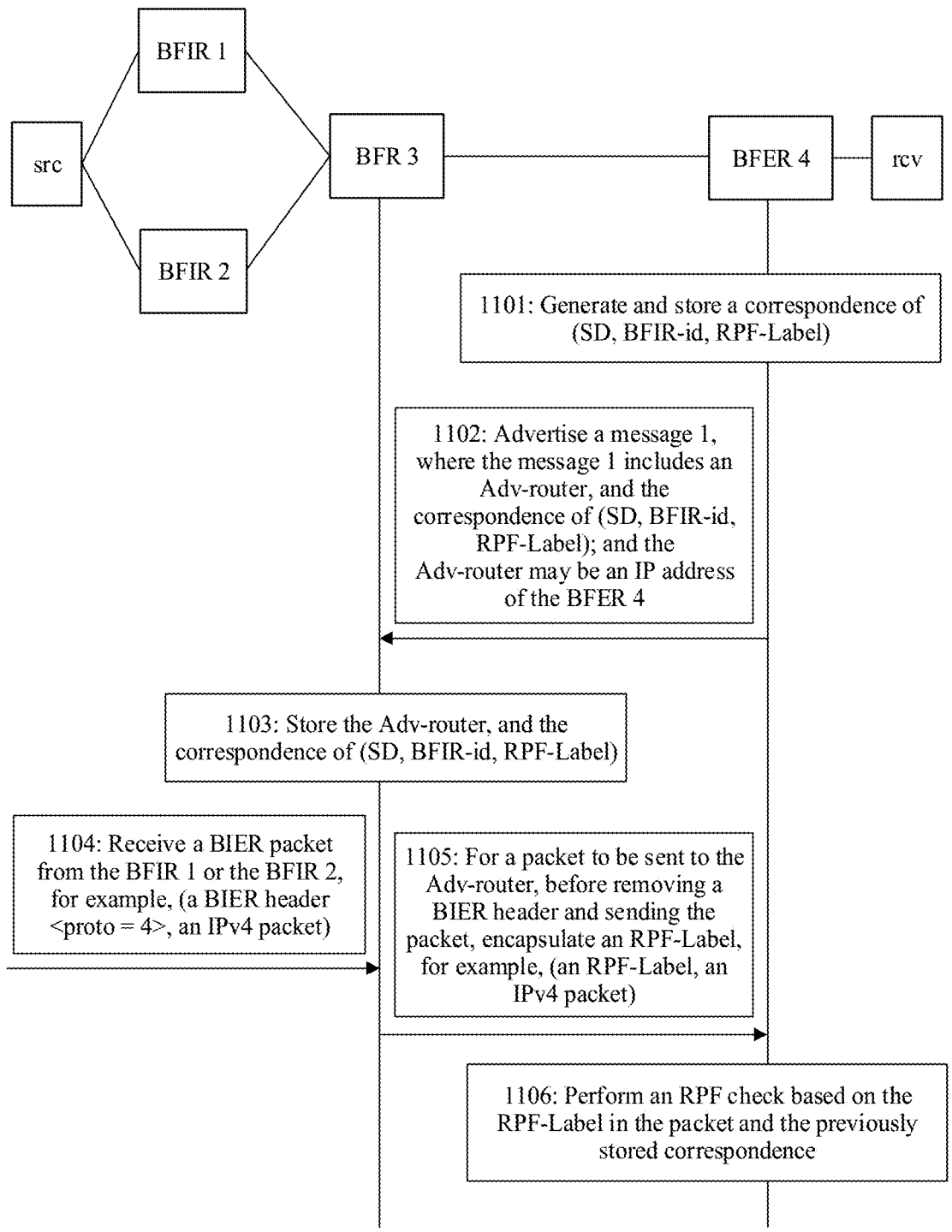
FIG. 11 is a schematic interaction diagram of a packet processing method according to an embodiment of this application.

Next, an example in which in the network shown in FIG. 4, the first network device is the BFR 3 in FIG. 4, and the second network device is the BFER 4 in FIG. 4 is used, and a packet processing process provided in this embodiment of this application shown in FIG. 11 is used as an example. In this embodiment, an example in which the target label is determined in manner 1 in step 502 in the embodiment shown in FIG. 5, and the information about the specified BFIR is the Sub-domain and the BFIR-id that are of the BFIR packet is used for description. The target label in this embodiment is different from the foregoing target label. In the packet processing method provided in this embodiment of this application, different BFIR-Prefixes may be configured for a plurality of Sub-domains on a same BFIR node device. This case is the same as a case when the BFIR information is a BFIR-Prefix. In essence, each BFIR-Prefix is allocated with a label. The plurality of Sub-domains on the same BFIR node device may also be configured with a same BFIR-Prefix. In this case, more labels are allocated in this embodiment than labels allocated in an embodiment when the BFIR information is the BFIR-Prefix.

A same BFR-id or different BFR-id may be configured for the plurality of Sub-domains on the same BFIR node device, and a BFR-id of a BFIR node device may also be represented as a BFIR-id. As shown in FIG. 11, the method provided in this embodiment of this application includes the following processes:

1101: The BFER 4 generates and stores a correspondence of (SD, BFIR-id, RPF-Label).

In an example embodiment, when the foregoing step 1101 is implemented, the information about BFIR node devices on which the RPF check is performed may be configured on the BFER 4 node device. For example, the following information is configured on the BFER 4:

```
Bier
    Sub-domain 1
        Php Apply rpf-label Bfir-id 1
        xxx
    Sub-domain 2
        Php Apply rpf-label Bfir-id 1
        xxx
```

Php Apply rpf-label Bfir-id 1 in the Sub-domain 1 indicates that the label for used for the RPF needs to allocated to (Sub-domain 1, BFIR-id=1), so that the BFER 4 can perform the RPF.

Similarly, Php Apply rpf-label Bfir-id 1 in the Sub-domain 2 indicates that the label for used for the RPF needs to allocated to (Sub-domain 2, BFIR-id=1), so that the BFER 4 can perform the RPF.

1102: The BFER 4 advertises a message 1, where the message 1 includes the Adv-router, and the correspondence of (SD, BFIR-id, RPF-Label).

For example, the Adv-router may be the IP address of the BFER 4. In addition, the message 1 carries the following information:

(Sub–domain = 1, BFIR–id = 1, Label = 1001);

(Sub–domain = 2, BFIR–id = 1, Label = 1002);

(Sub–domain = 1, BFIR–id = 2, Label = 1003); and (Sub–domain = 2, BFIR–id = 2, Label = 1004).

(Sub-domain=1, BFIR-id=1) and (Sub-domain=2, BFIR-id=1) both correspond to the BFIR 1; and (Sub-domain=1, BFIR-id=2) and (Sub-domain=2, BFIR-id=2) correspond to the BFIR 2.

After the BFER 4 establishes the foregoing corresponding correspondence, when the BFER 4 advertises the BIER information, the BFER 4 allows the route carrying the PHP Request to carry the foregoing information, and the advertised message may further carry the IP address 4.4.4.4 or the IPv6 address of the BFER 4. For example, a packet format in which the IS-IS carries a BFIR-Prefix label is used as an example in FIG. 12A, FIG. 12B, and FIG. 12C.

Figure 12A:
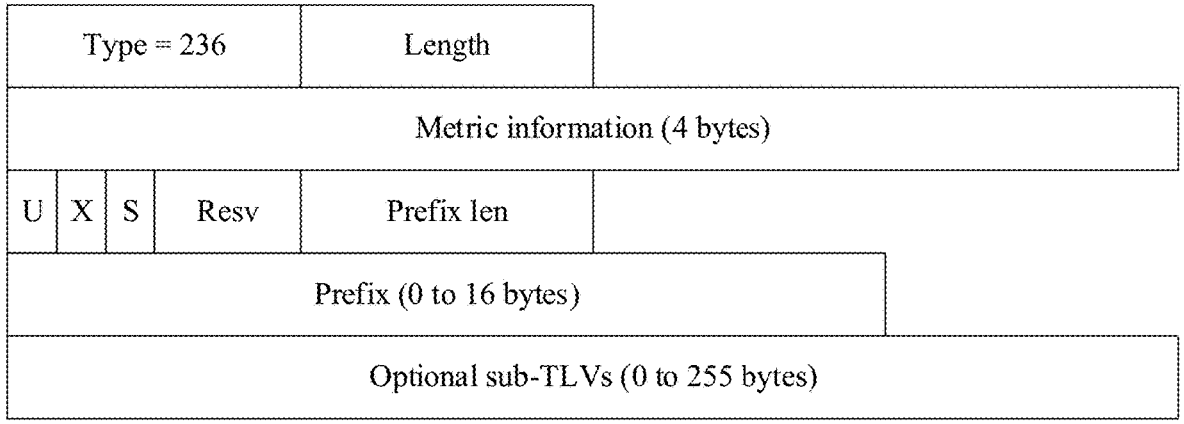
FIG. 12A, FIG. 12B, and FIG. 12C are a schematic diagram of a format of a BIER packet according to an embodiment of this application.
Figure 12B:
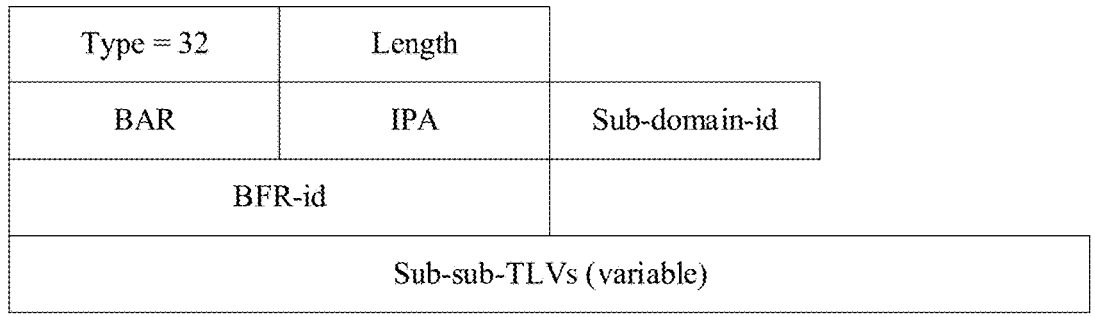
Figure 12C:
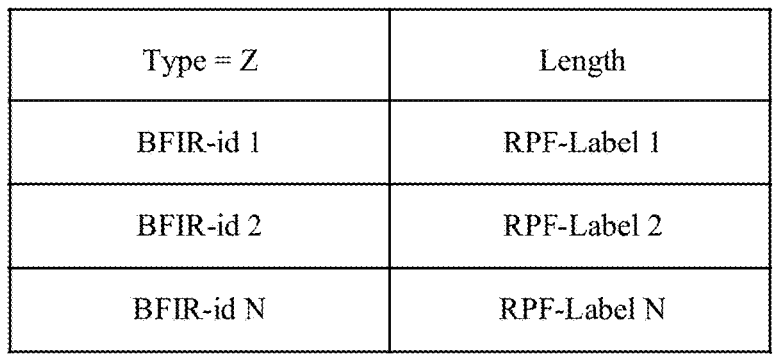

In FIG. 12A, a TLV of Type=236 carries the IP address of the BFER 4 node device, for example, the IPv6 address of the BFER 4 is carried in a Prefix field. In FIG. 12B, a TLV of Type=32 carries the Sub-domain-id of the BFER 4 node device, and a sub-sub-TLVs field of the TLV may have a sub-TLV, for example, the sub-TLV carrying the PHP Request (for example, the TLV defined in draft-ietf-bier-php-03 in the conventional technology). In FIG. 12C, a TLV of Type=Z carries a correspondence between the BFIR-id and the RPF-Label in a Sub-domain. For example, there may be one or more correspondences. In addition, a Length field may be used to learn of a quantity of correspondences.

In addition, the TLV of Type=32 is a sub-TLV of the TLV of Type=236, namely, an Optional sub-TLVs field located in the TLV of Type=236. The TLV of Type=Z may be a sub-sub-TLV of the TLV of Type=32, namely, a sub-sub-TLVs located in the TLV of Type=32. This indicates a correspondence between the BFIR-id field and the RPF-Label in a specific Sub-domain.

1103: The BFR 3 stores the Adv-router, and the correspondence of (SD, BFIR-id, RPF-Label).

The BFR 3 receives the information advertised by the BFER 4, stores the correspondence, establishes the following forwarding information, and forwards a received packet. The forwarding information includes the following information: forwarding information 1: (a BIFT-id of a BIER packet, a corresponding BFR-NBR, a PHP-Request, an FBM), where the forwarding information 1 has the following entry: (the BIFT-id of the BIER packet=X, the corresponding BFR-NBR=4.4.4.4, the PHP-Request=True, the FBM); forwarding information 5: (a BIFT-id of a BIER packet, a Sub-domain of a BIER packet), where the forwarding information 5 has the following two entries: (the BIFT-id of the BIER packet=X, the Sub-domain of the BIER packet=1); and (the BIFT-id of the BIER packet=X, the Sub-domain of the BIER packet=2); and forwarding information 6: a label that is used for the RPF and that is allocated by the BFER 4<1.1.1.1> to each (Sub-domain, BFIR-id), where the forwarding information 6 has the following entries: (Adv-Router=4.4.4.4, Sub-domain=1, a BFIR-id of a packet=1, Label=1001); (Adv-Router=4.4.4.4, Sub-domain=2, a BFIR-id of a packet=1, Label=1002); (Adv-Router=4.4.4.4, Sub-domain=1, a BFIR-id of a packet=2, Label=1002); and (Adv-Router=4.4.4.4, Sub-domain=2, a BFIR-id of a packet=2, Label=1003).

The BFR 3 determines, based on the forwarding information 1, that a packet whose BIFT-id is X needs to be copied to 4.4.4.4 and a BIER header of the packet needs to be removed. The BFR 3 determines, based on the forwarding information 5, a Sub-domain to which a BIER packet whose BIFT-id is X and BFIR-id is 1 belongs, for example, determines that the packet belongs to a Sub-domain=1. Then, the BFR 3 determines, based on the forwarding information 6, that the packet needs to be encapsulated with a label corresponding to (Adv-Router=4.4.4.4, Sub-domain=1, BFIR-id=1), namely, the label 1001. Similarly, for a BIER packet whose BIFT-id is X and BFIR-id is 2, the BFR 3 needs to determine that the packet needs to be encapsulated with a label corresponding to (Adv-Router=4.4.4.4, Sub-domain=1, BFIR-id=2), namely, the label 1002.

1104: The BFR 3 receives the BIER packet.

For example, the BIER packet of Proto=4 received by the BFR 3 may be in the following format: a BIER header (Proto=4)+an inner IPv4 packet, where the BIER header may be preceded by the link layer header, for example, the Ethernet header. Herein, only an example in which the listed packet does not include the link layer header is used for description.

1105: For the packet to be sent to the BFER 4, before removing the BIER header and sending the packet, the BFR 3 encapsulates the RPF-Label.

For example, the packet sent by the BFR 3 is in the following format: (an RPF-Label, an IPv4 packet). In an example embodiment, the packet sent by the BFR 3 to the BFER 4 may also be in the following format: a label stack (including the label 1001)+an inner IPv4 packet, where the label stack may be preceded by the link layer header, for example, the Ethernet header. Herein, only the example in which the listed packet does not include the link layer header is used for description.

In an example embodiment, the packet sent by the BFR 3 to the BFER 4 may also be in the following format: a label stack (including the label of the unicast tunnel to the BFER 4 and the label 1001)+an inner IPv4 packet.

1106: The BFER 4 performs the RPF check based on the RPF-Label in the packet and the previously stored correspondence.

In an example embodiment, after receiving the BIER packet, the BFER 4 first processes the label stack. For example, because the label stack includes 1001 or 1002, it is determined, based on 1001 or 1002 in the label stack, that correspondence information (Sub-domain, BFIR-id) of the packet is (Sub-domain=1, BFIR-id=1) or (Sub-domain=1, BFIR-id=2). For example, this is determined based on the correspondence established on the BFER 4 in step 1 above.

Then, the BFER 4 processes the IPv4 or IPv6 packet, and performs RPF based on the determined information. For example, the BFER 4 queries the multicast forwarding table based on the source address and the destination address in the inner IPv4 packet, to determine that the packet is expected to come from the identifier 1 of the BFIR 1, and determine that the packet actually comes from the identifier 2 of the BFIR 1 based on that the foregoing determined packet actually comes from (Sub-domain=1, BFIR-id=1). If the identifier 1 and the identifier 2 are the same, the RPF check succeeds. If the identifier 1 and the identifier 2 are different, the RPF check fails.

In the process in which the BFER 4 obtains the identifier 2 of the BFIR 1 based on (Sub-domain=1, BFIR-id=1), the BFER 4 may obtain the correspondence between the BFIR-Prefix and the identifier 2 from the BGP MVPN routing message based on the method described in the RFC 8556, where the identifier 2 is the IP address of the BFIR 1, and may be the same as or different from the BFIR-Prefix.

Figure 13:
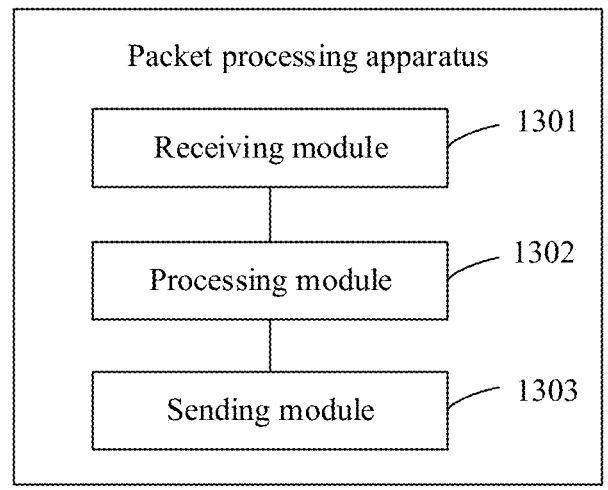
FIG. 13 is a schematic diagram of a structure of a packet processing apparatus according to an embodiment of this application.

An embodiment of this application provides a packet processing apparatus. The apparatus is applied to the first network device in the BIER communication network, and the BIER communication network includes the first network device and the second network device. The first network device may include the packet processing apparatus, or the first network device is the packet processing apparatus. The first network device is the first network device in FIG. 5, FIG. 7, FIG. 9, and FIG. 11. Based on a plurality of modules shown below in FIG. 13, a packet processing apparatus shown in FIG. 13 can perform all or some of operations performed by the first network device. Refer to FIG. 13. The apparatus includes: a receiving module 1301, configured to receive a first BIER packet, where the first BIER packet includes a first BIER header; a processing module 1302, configured to: when the first BIER packet is a packet sent to a second network device in a BIER domain, determine whether the second network device is an edge node device in a BIER communication network and whether the second network device supports BIER packet forwarding, where the BIER communication network communicates with a network device outside the BIER communication network by using the edge node device; and in response to that the first network device determines that the second network device is the edge node device in the BIER communication network and that the second network device does not support BIER packet forwarding, determine a target label, and update the first BIER packet to a second BIER packet, where the second BIER packet includes the target label and does not include a first BIER header, and the target label is used to trigger the second network device to perform a reverse path forwarding RPF check based on the target label; and a sending module 1303, configured to send the second BIER packet to the second network device.

In an example embodiment, the processing module 1302 is configured to: obtain information about the second network device, and determine, based on the information about the second network device, whether the second network device is the edge node device in the BIER communication network and whether the second network device supports BIER packet forwarding.

In an example embodiment, the target label includes a label corresponding to a specified BFIR, the label corresponding to the specified BFIR is allocated by the second network device, and the specified BFIR is a BFIR for sending the first BIER packet.

In an example embodiment, the target label further includes a label of a unicast tunnel to the second network device.

In an example embodiment, the target label further includes a label used to indicate a packet type.

In an example embodiment, the processing module 1302 is configured to: obtain a first correspondence, where the first correspondence is a correspondence between information about the specified BFIR and the label corresponding to the specified BFIR; and determine, based on the first correspondence, the label corresponding to the specified BFIR.

In an example embodiment, the processing module 1302 is configured to obtain a first correspondence and a second correspondence, where the first correspondence is a correspondence between information about the specified BFIR and the label corresponding to the specified BFIR, and the second correspondence is a correspondence between the packet type and the label used to indicate the packet type; and determine, based on the first correspondence, the label corresponding to the specified BFIR, and determine, based on the second correspondence, the label used to indicate the packet type.

In an example embodiment, the processing module 1302 is configured to: obtain a third correspondence, where the third correspondence is a correspondence among a sub-domain, information about the specified BFIR, and the label corresponding to the specified BFIR; and determine, based on the third correspondence, the label corresponding to the specified BFIR.

In an example embodiment, the BIER communication network is the BIER domain, and the first network device is a bit forwarding router BFR in the BIER domain.

Figure 14:
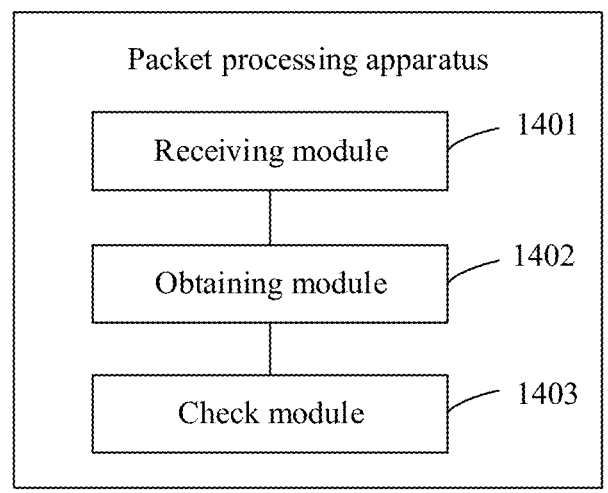
FIG. 14 is a schematic diagram of a structure of a packet processing apparatus according to an embodiment of this application.

An embodiment of this application provides a packet processing apparatus. The apparatus is applied to a second network device in a BIER communication network, the second network device is an edge node device in the BIER communication network, and the BIER communication network communicates with a network device outside the BIER communication network by using the edge node device. The second network device may include the packet processing apparatus, or the second network device is the packet processing apparatus. The second network device is the second network device in FIG. 5, FIG. 7, FIG. 9, and FIG. 11. Based on a plurality of modules shown below in FIG. 14, the packet processing apparatus shown in FIG. 14 can perform all or some of operations performed by the second network device. Refer to FIG. 14. The apparatus includes: a receiving module 1401, configured to receive a second BIER packet, where the second BIER packet is obtained through an updated first BIER packet, the first BIER packet includes a first BIER header, the second BIER packet includes a target label and does not include the first BIER header, and the target label is used to trigger the second network device to perform a reverse path forwarding RPF check based on the target label; an obtaining module 1402, configured to obtain the target label in the second BIER packet; and a check module 1403, configured to perform the RPF check based on the target label.

In an example embodiment, the target label includes a label corresponding to a specified BFIR, the label corresponding to the specified BFIR is allocated by the second network device, and the specified BFIR is a BFIR for sending the first BIER packet.

In an example embodiment, the target label further includes a label of a unicast tunnel to the second network device.

In an example embodiment, the target label further includes a label used to indicate a packet type.

In an example embodiment, the check module 1403 is configured to: determine information about the specified BFIR based on the label corresponding to the specified BFIR and a first correspondence, where the first correspondence is a correspondence between the information about the specified BFIR and the label corresponding to the specified BFIR; determine information about a first target BFIR based on the second BIER packet, where the information about the first target BFIR indicates information about a network device that is corresponding to a payload of the second BIER packet and that is expected by the second network device; and compare the information about the specified BFIR with the information about the first target BFIR, and determine an RPF check result based on a comparison result.

Figure 15:
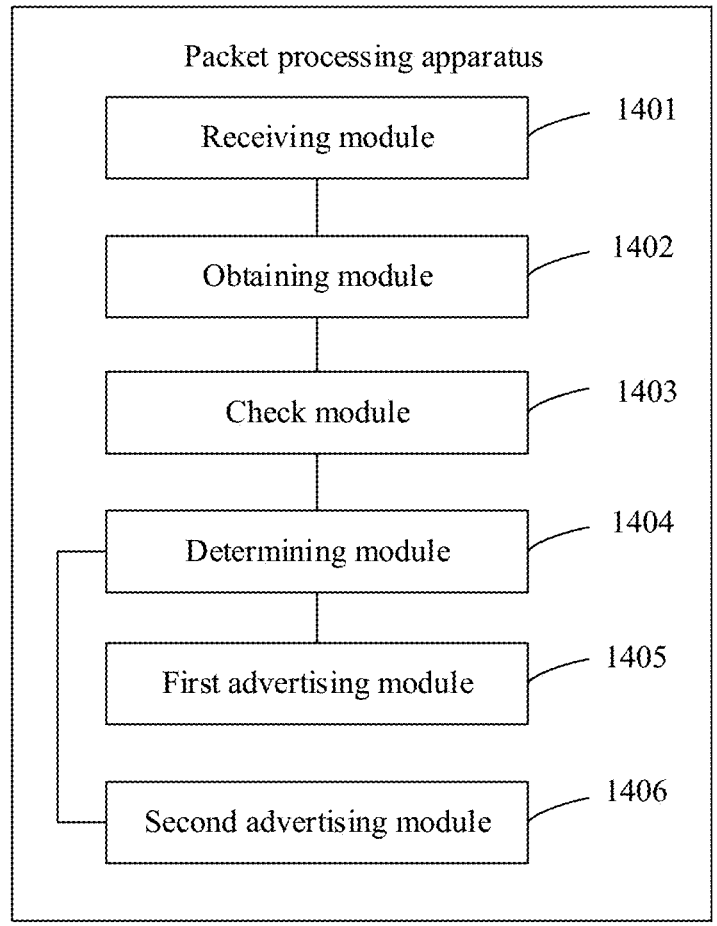
FIG. 15 is a schematic diagram of a structure of a packet processing apparatus according to an embodiment of this application.

In an example embodiment, refer to FIG. 15. The apparatus further includes: a determining module 1404, configured to: determine, based on a second correspondence, the label used to indicate the packet type, where the second correspondence is a correspondence between the packet type and the label used to indicate the packet type; and determine the packet type based on the label used to indicate the packet type.

In an example embodiment, the check module 1403 is configured to: determine a sub-domain and information about the specified BFIR based on the label corresponding to the specified BFIR and a third correspondence, where the third correspondence is a correspondence among the sub-domain, the information about the specified BFIR, and the label corresponding to the specified BFIR; determine information about a second target BFIR based on the second BIER packet, where the information about the second target BFIR indicates information about a network device that is corresponding to a payload of the second BIER packet and that is expected by the second network device, and the information about the second target BFIR includes the sub-domain and a BFIR identifier; and compare the sub-domain, the information about the specified BFIR, and the information about the second target BFIR, and determine an RPF check result based on a comparison result.

In an example embodiment, refer to FIG. 15. The apparatus further includes: a first advertising module 1405, configured to: obtain the first correspondence between the information about the specified BFIR and the label corresponding to the specified BFIR, and advertise the first correspondence.

In an example embodiment, the first advertising module 1405 is further configured to: obtain the second correspondence between the packet type and the label used to indicate the packet type, and advertise the second correspondence.

In an example embodiment, refer to FIG. 15. The apparatus further includes: a second advertising module 1406, configured to: obtain the third correspondence among the sub-domain, the information about the specified BFIR, and the label corresponding to the specified BFIR, and advertise the third correspondence.

It should be understood that, when the apparatuses provided in FIG. 13 to FIG. 15 implement functions of the apparatuses, division into the foregoing functional modules is merely used as an example for description. In an actual application, the foregoing functions may be allocated and implemented by different functional modules based on requirements, in other words, an internal structure of a device is divided into different functional modules, to implement all or some of the foregoing described functions. In addition, the apparatuses provided in the foregoing embodiments and the method embodiments belong to a same concept. For a specific implementation process thereof, refer to the method embodiments. Details are not described herein again.

An embodiment of this application further provides a first network device. The first network device is configured to execute a function executed by the first network device in any one of the foregoing methods.

An embodiment of this application further provides a second network device. The second network device is configured to execute a function executed by the second network device in any one of the foregoing methods.

Figure 16:
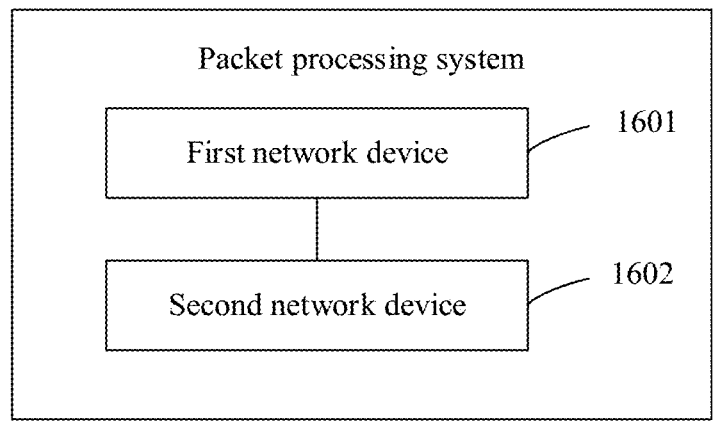
FIG. 16 is a schematic diagram of a structure of a packet processing system according to an embodiment of this application.

An embodiment of this application further provides a packet processing system. Refer to FIG. 16. The system includes a first network device 1601 and a second network device 1602.

The first network device 1601 is configured to execute a function executed by the first network device in any one of the foregoing methods. The second network device 1602 is configured to execute a function executed by the second network device in any one of the foregoing methods.

Figure 17:
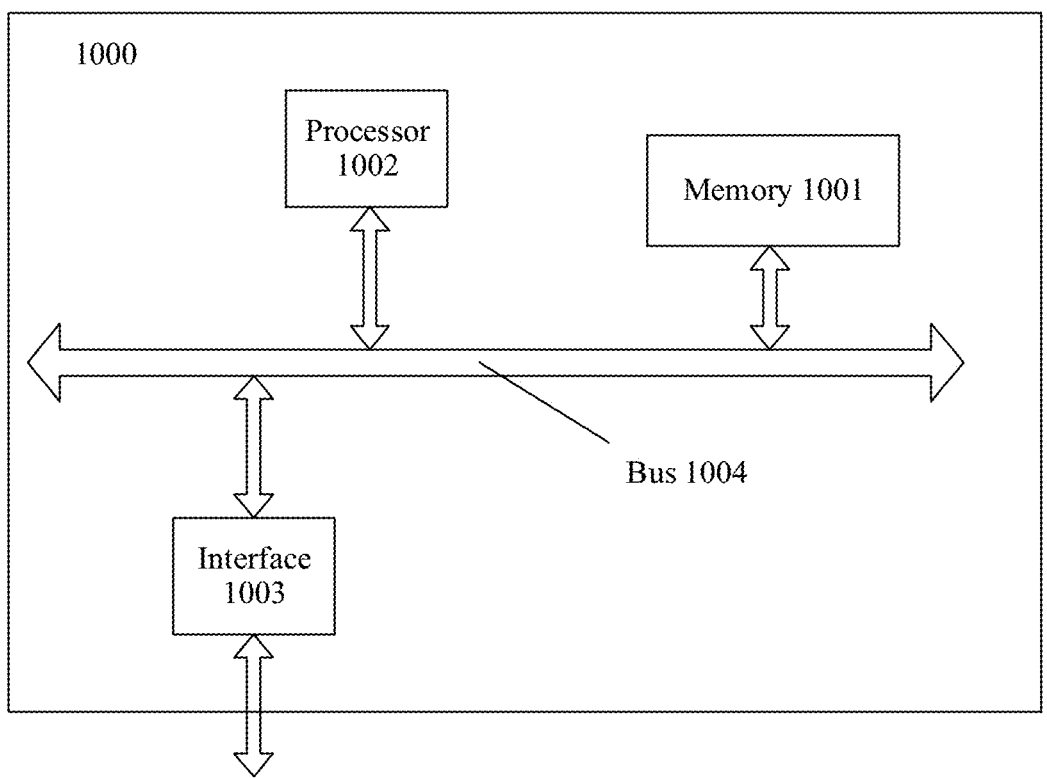
FIG. 17 is a schematic diagram of a structure of a network device according to an embodiment of this application.

Refer to FIG. 17. An embodiment of this application further provides a network device 1000. The network device 1000 is configured to perform operations in the foregoing packet processing methods. The network device 1000 shown in FIG. 17 is configured to perform operations related to the first network device or the second network device in the foregoing packet processing methods. The network device 1000 includes a memory 1001, a processor 1002, and an interface 1003. The memory 1001, the processor 1002, and the interface 1003 are connected through a bus 1004.

The memory 1001 stores at least one instruction, and the at least one instruction is loaded and executed by the processor 1002, to implement any one of the foregoing packet processing methods.

The interface 1003 is used for communication with another device in a network. The interface 1003 may implement communication in a wireless or wired manner. For example, the interface 1003 may be a network adapter. For example, the network device 1000 may communicate with a server through the interface 1003.

For example, the network device shown in FIG. 17 is the first network device in FIG. 5, FIG. 7, FIG. 9, FIG. 10A, FIG. 10B, FIG. 10C, FIG. 10D, and FIG. 11. The processor 1002 reads the instruction in the memory 1001, so that the network device shown in FIG. 17 can perform all or some of the operations performed by the first network device.

For another example, the network device shown in FIG. 17 is the second network device in FIG. 5, FIG. 7, FIG. 9, FIG. 10A, FIG. 10B, FIG. 10C, and FIG. 10D, and FIG. 11. The processor 1002 reads the instruction in the memory 1001, so that the network device shown in FIG. 17 can perform all or some of the operations performed by the second network device.

It should be understood that FIG. 17 shows only a simplified design of the network device 1000. In an actual application, the network device may include any quantity of interfaces, processors, or memories. In addition, the processor may be a central processing unit (CPU), or may be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set computing (RISC) machines (ARM) architecture.

Further, in an optional embodiment, the memory may include a read-only memory and a random-access memory (RAM), and provide instructions and data for the processor. The memory may further include a non-volatile random-access memory. For example, the memory may further store information about a device type.

The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a RAM, and is used as an external cache. For example but not limitation, many forms of RAMs are available, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a SynchLink dynamic random-access memory (SLDRAM), and a Direct Rambus random-access memory (DR RAM).

Figure 18:
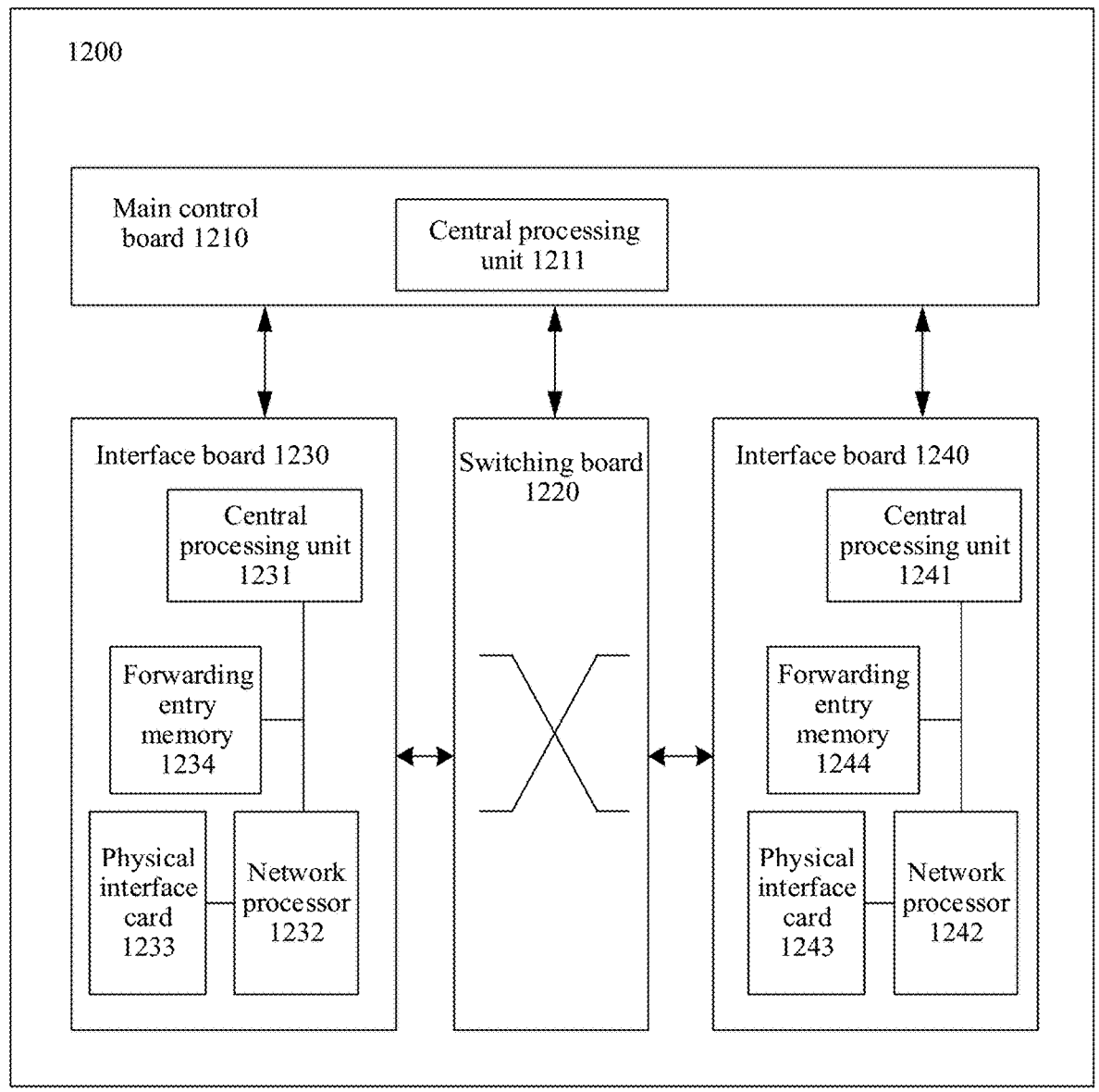
FIG. 18 is a schematic diagram of a structure of another network device according to an embodiment of this application.

FIG. 18 is a schematic diagram of a structure of hardware of another network device 1200 according to an embodiment of this application. The network device 1200 shown in FIG. 18 may perform corresponding steps performed by the first network device or the second network device in the methods in the foregoing embodiments.

As shown in FIG. 18, the network device 1200 includes a main control board 1210, an interface board 1230, a switching board 1220, and an interface board 1240. The main control board 1210, the interface boards 1230 and 1240, and the switching board 1220 are connected to a system backboard through a system bus for communication. The main control board 1210 is configured to complete functions such as system management, device maintenance, and protocol processing. The switching board 1220 is configured to exchange data between the interface boards (the interface board is also referred to as a line card or a service board). The interface boards 1230 and 1240 are configured to provide various service interfaces (such as a point of sale (POS) interface, a Gigabit Ethernet (GE) interface, and an asynchronous transfer mode (ATM) interface), and forward a data packet.

The interface board 1230 may include a central processing unit 1231, a forwarding entry memory 1234, a physical interface card 1233, and a network processor 1232. The central processing unit 1231 is configured to control and manage the interface board, and communicate with a central processing unit on the main control board. The forwarding entry memory 1234 is configured to store a forwarding entry. The physical interface card 1233 is configured to receive and send traffic. The network processor 1232 is configured to control, based on the forwarding entry, the physical interface card 1233 to receive and send the traffic.

Specifically, the physical interface card 1233 is configured to receive a BIER packet. The physical interface card 1233 is further configured to forward an updated BIER packet to a next-hop network device of the network device.

After receiving the BIER packet, the physical interface card 1233 sends the BIER packet to the central processing unit 1211 by using the central processing unit 1231, and the central processing unit 1211 processes the BIER packet.

The central processing unit 1211 is further configured to determine whether another network device is an edge node device in a BIER communication network and whether the other network device supports BIER forwarding, or is configured to perform an RPF check.

The central processing unit 1231 is further configured to control the network processor 1232 to obtain the forwarding entry in the forwarding entry memory 1234, and the central processing unit 1231 is further configured to control the network processor 1232 to forward the updated BIER packet to the next-hop network device on a transmission path by using the physical interface card 1233.

It should be understood that operations on the interface board 1240 are the same as operations on the interface board 1230 in this embodiment of the present application. For brevity, details are not described again. It should be understood that the network device 1200 in this embodiment may correspond to the functions and/or the various implemented steps in the foregoing method embodiments. Details are not described herein again.

In addition, it should be noted that there may be one or more main control boards; and when there is a plurality of main control boards, the main control boards may include an active main control board and a standby main control board. There may be one or more interface boards; and a network device having a stronger data processing capability provides more interface boards. There may also be one or more physical interface cards on the interface board. There may be no switching board or one or more switching boards. When there is a plurality of switching boards, load sharing and redundancy backup may be jointly implemented. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. A specific architecture that is to be used depends on a specific networking deployment scenario. This is not limited herein.

A network management system is further provided. The system includes a first network device and a second network device. The first network device is configured to execute a function executed by the first network device in the foregoing network management methods, and the second network device is configured to execute a function executed by the second network device in the foregoing network management methods.

A computer-readable storage medium is further provided. The storage medium stores at least one instruction, and a processor loads and executes the instruction to implement any one of the foregoing network management methods.

This application provides a computer program. When the computer program is executed by a computer, a processor or the computer may be enabled to perform corresponding operations and/or procedures in the foregoing method embodiments.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on the computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium (for example, a solid state disk).

The foregoing descriptions are merely embodiments of this application, but are not intended to limit this application. Any modification, equivalent replacement, or improvement made without departing from the principle of this application should fall within the protection scope of this application.

What is claimed is:

1. A packet processing method implemented by a first network device in a Bit Index Explicit Replication (BIER) communication network, wherein the BIER communication network communicates with a network device outside of the BIER communication network by using an edge node device in the BIER communication network, and wherein the packet processing method comprises:
   receiving a first BIER packet, wherein the first BIER packet comprises a first BIER header;
   determining, when the first BIER packet is sent to a second network device in the BIER communication network, whether the second network device is the edge node device and whether the second network device supports BIER packet forwarding;
   in response to determining that the second network device is the edge node device and that the second network device does not support BIER packet forwarding, determining a target label and updating the first BIER packet to a second BIER packet, wherein the second BIER packet comprises the target label and does not comprise the first BIER header, and wherein the target label is configured to trigger the second network device to perform a reverse path forwarding (RPF) check based on the target label; and
   sending the second BIER packet to the second network device.

2. The packet processing method of claim 1, wherein determining whether the second network device is the edge node device and whether the second network device supports BIER packet forwarding comprises:
   obtaining information about the second network device; and
   determining, based on the information, whether the second network device is the edge node device and whether the second network device supports BIER packet forwarding.

3. The packet processing method of claim 1, wherein the target label comprises a first label corresponding to a specified bit forwarding ingress router (BFIR), wherein the first label is allocated by the second network device, and wherein the specified BFIR is for sending the first BIER packet.

4. The packet processing method of claim 3, wherein the target label further comprises a second label of a unicast tunnel to the second network device.

5. The packet processing method of claim 3, wherein the target label further comprises a second label indicating a packet type.

6. The packet processing method of claim 5, wherein determining the target label comprises:
   obtaining a first correspondence and a second correspondence, wherein the first correspondence is between information about the specified BFIR and the first label, and wherein the second correspondence is between the packet type and the second label;
   determining, based on the first correspondence, the first label; and
   determining, based on the second correspondence, the second label.

7. The packet processing method of claim 3, wherein determining the target label comprises:
   obtaining a first correspondence, wherein the first correspondence is between information about the specified BFIR and the first label; and
   determining, based on the first correspondence, the first label.

8. The packet processing method of claim 3, wherein determining the target label comprises:
   obtaining a third correspondence, wherein the third correspondence is among a sub-domain, information about the specified BFIR, and the first label; and
   determining, based on the third correspondence, the first label.

9. The packet processing method of claim 1, wherein the BIER communication network is a BIER domain, and wherein the first network device is a bit forwarding router (BFR) in the BIER domain.

10. A packet processing method implemented by a second network device in a Bit Index Explicit Replication (BIER) communication network, wherein the second network device is an edge node device in the BIER communication network, wherein the BIER communication network communicates with a network device outside the BIER communication network by using the edge node device, and wherein the packet processing method comprises:
    receiving a second BIER packet from a first network device in the BIER communication network, wherein the second BIER packet is from a first BIER packet updated by the first network device, wherein the first BIER packet comprising a first BIER header, wherein the second BIER packet comprises a target label and does not comprise the first BIER header, and wherein the target label is configured to trigger the second network device to perform a reverse path forwarding (RPF) check based on the target label;
    obtaining the target label in the second BIER packet; and
    performing the RPF check based on the target label.

11. The packet processing method of claim 10, wherein the target label comprises a first label corresponding to a specified bit forwarding ingress router (BFIR), wherein the first label is allocated by the second network device, and wherein the specified BFIR is for sending the first BIER packet.

12. The packet processing method of claim 11, wherein the target label further comprises a second label of a unicast tunnel to the second network device.

13. The packet processing method of claim 11, wherein the target label further comprises a second label indicating a packet type.

14. The packet processing method of claim 13, further comprising:
    determining, based on a second correspondence, the second label, wherein the second correspondence is between the packet type and the second label; and
    determining the packet type based on the second label.

15. The packet processing method of claim 14, wherein before receiving the second BIER packet, the packet processing method further comprises:
obtaining the second correspondence; and
advertising the second correspondence.

16. The packet processing method of claim 11, wherein performing the RPF check based on the target label comprises:
determining first information about the specified BFIR based on the first label and a first correspondence, wherein the first correspondence is between the first information and the first label;
determining second information about a first target BFIR based on the second BIER packet, wherein the second information is about a third network device that is corresponding to a payload of the second BIER packet and that is expected by the second network device;
comparing the first information with the second information to obtain a comparison result; and
determining an RPF check result based on the comparison result.

17. The packet processing method of claim 16, wherein before receiving the second BIER packet, the packet processing method further comprises:
obtaining the first correspondence; and
advertising the first correspondence.

18. The packet processing method of claim 11, wherein performing the RPF check based on the target label comprises:
determining a sub-domain and first information about the specified BFIR based on the first label and a third correspondence, wherein the third correspondence is among the sub-domain, the first information, and the first label;
determining second information about a second target BFIR based on the second BIER packet, wherein the second information is about a third network device that is corresponding to a payload of the second BIER packet and that is expected by the second network device, and wherein the second information comprises the sub-domain and a BFIR identifier;
comparing the sub-domain, the first information, and the second information to obtain a comparison result; and
determining an RPF check result based on the comparison result.

19. The packet processing method of claim 18, wherein before receiving the second BIER packet, the packet processing method further comprises:
obtaining the third correspondence; and
advertising the third correspondence.

20. A packet processing apparatus implemented by a first network device in a Bit Index Explicit Replication (BIER) communication network, wherein the BIER communication network communicates with a network device outside the BIER communication network by using an edge node device, and wherein the packet processing apparatus comprises:
a non-transitory memory configured to store instructions; and
a processor coupled to the non-transitory memory, wherein the instructions, when executed by the processor, cause the packet processing apparatus to be configured to:
receive a first BIER packet, wherein the first BIER packet comprises a first BIER header;
when the first BIER packet is sent to a second network device in the BIER communication network, determine whether the second network device is the edge node device and whether the second network device supports BIER packet forwarding;
in response to determining that the second network device is the edge node device and that the second network device does not support BIER packet forwarding, determine a target label and update the first BIER packet to a second BIER packet, wherein the second BIER packet comprises the target label and does not comprise the first BIER header, and wherein the target label is configured to trigger the second network device to perform a reverse path forwarding (RPF) check based on the target label; and
send the second BIER packet to the second network device.

21. The packet processing apparatus of claim 20, wherein the instructions, when executed by the processor, further cause the packet processing apparatus to be configured to:
obtain information about the second network device, and
determine, based on the information, whether the second network device is the edge node device and whether the second network device supports BIER packet forwarding.

22. The packet processing apparatus of claim 20, wherein the target label comprises a first label corresponding to a specified bit forwarding ingress router (BFIR), wherein the first label is allocated by the second network device, and wherein the specified BFIR is for sending the first BIER packet.

23. The packet processing apparatus of claim 22, wherein the target label further comprises a second label of a unicast tunnel to the second network device.

24. The packet processing apparatus of claim 22, wherein the target label further comprises a second label indicating a packet type.

25. The packet processing apparatus of claim 22, wherein the instructions, when executed by the processor, further cause the packet processing apparatus to be configured to:
obtain a first correspondence, wherein the first correspondence is between information about the specified BFIR and the first label; and
determine, based on the first correspondence, the first label.

26. A packet processing apparatus implemented by a second network device in a Bit Index Explicit Replication (BIER) communication network, wherein the second network device is an edge node device in the BIER communication network, wherein the BIER communication network communicates with a network device outside the BIER communication network by using the edge node device, and wherein the packet processing apparatus comprises:
a non-transitory memory configured to store instructions; and
a processor coupled to the non-transitory memory, wherein the instructions, when executed by the processor, cause the packet processing apparatus to be configured to:
receive a second BIER packet from a first network device in the BIER communication network, wherein the second BIER packet is obtained through a first BIER packet updated by the first network device, wherein the first BIER packet comprises a first BIER header, wherein the second BIER packet comprises a target label and does not comprise the first BIER header, and wherein the target label is configured to trigger the second network device to perform a reverse path forwarding (RPF) check based on the target label;

obtain the target label in the second BIER packet; and perform the RPF check based on the target label.

27. The packet processing apparatus of claim 26, wherein the target label comprises a first label corresponding to a specified bit forwarding ingress router (BFIR), wherein the first label is allocated by the second network device, and wherein the specified BFIR is for sending the first BIER packet.

28. The packet processing apparatus of claim 27, wherein the target label further comprises a second label of a unicast tunnel to the second network device.

29. The packet processing apparatus of claim 27, wherein the instructions, when executed by the processor, further cause the packet processing apparatus to be configured to:

determine first information about the specified BFIR based on the first label and a first correspondence, wherein the first correspondence is between the first information and the first label;

determine second information about a first target BFIR based on the second BIER packet, wherein the second information indicates third information about a third network device that is corresponding to a payload of the second BIER packet and that is expected by the second network device;

compare the first information with the second information about the first target BFIR to obtain a comparison result; and determine an RPF check result based on the comparison result.

30. The packet processing apparatus of claim 26, wherein the target label further comprises a second label indicating a packet type.

* * * * *